(12) United States Patent
Fritz

(10) Patent No.: US 10,431,856 B2
(45) Date of Patent: Oct. 1, 2019

(54) METHOD FOR PRODUCING A BATTERY CONTACT-MAKING SYSTEM, AND BATTERY CONTACT-MAKING SYSTEM

(71) Applicant: ElringKlinger AG, Dettingen (DE)

(72) Inventor: Wolfgang Fritz, Metzingen (DE)

(73) Assignee: ElringKlinger AG, Dettingen (DE)

( * ) Notice: Subject to any disclaimer, the term of this patent is extended or adjusted under 35 U.S.C. 154(b) by 334 days.

(21) Appl. No.: 14/920,457

(22) Filed: Oct. 22, 2015

(65) Prior Publication Data
US 2016/0043448 A1   Feb. 11, 2016

Related U.S. Application Data

(63) Continuation of application No. PCT/EP2014/057133, filed on Apr. 9, 2014.

(30) Foreign Application Priority Data

Apr. 23, 2013 (DE) .......... 10 2013 207 356

(51) Int. Cl.
*H01M 10/48* (2006.01)
*H01M 2/20* (2006.01)
*H01M 10/42* (2006.01)

(52) U.S. Cl.
CPC ......... *H01M 10/482* (2013.01); *H01M 2/204* (2013.01); *H01M 2/206* (2013.01); *H01M 10/425* (2013.01); *H01M 10/486* (2013.01); *H01M 2220/20* (2013.01)

(58) Field of Classification Search
None
See application file for complete search history.

(56) References Cited

U.S. PATENT DOCUMENTS

| 4,920,019 A | 4/1990 | Stoklosa et al. |
| 8,562,696 B2 | 10/2013 | Hauck et al. |

(Continued)

FOREIGN PATENT DOCUMENTS

| AT | 511119 | 9/2012 |
| DE | 10 2007 020 295 | 11/2008 |

(Continued)

*Primary Examiner* — Barbara L Gilliam
*Assistant Examiner* — Zhongqing Wei
(74) *Attorney, Agent, or Firm* — Womble Bond Dickinson (US) LLP

(57) ABSTRACT

In order to provide a method for producing a cell contact-making system for an electrochemical device which is executable in a simple manner and which enables a reliable signal conductor system with precise positioning to be produced, it is proposed that production of the cell contact-making system should includes separating out from a starting material at least one signal conductor group, which includes at least two signal conductor tracks of a signal conductor system of the cell contact-making system and at least one connection element by means of which at least two of the signal conductor tracks are connected to one another; connecting the signal conductor tracks of the signal conductor track group to a respective cell connector, cell terminal connector or sensor element of the cell contact-making system; and removing the at least one connection element.

14 Claims, 26 Drawing Sheets

(56) References Cited

U.S. PATENT DOCUMENTS

| | | | | |
|---|---|---|---|---|
| 2005/0110458 A1* | 5/2005 | Seman, Jr. | ............ | H01M 2/204 320/114 |
| 2006/0019155 A1 | 1/2006 | Seman, Jr. et al. | | |
| 2006/0160422 A1* | 7/2006 | Bang | .................. | H01M 10/425 439/627 |
| 2010/0071933 A1* | 3/2010 | Otsuka | .................... | C21D 9/60 174/128.1 |
| 2011/0028012 A1* | 2/2011 | Chien | .................... | H01R 13/53 439/188 |
| 2011/0097618 A1* | 4/2011 | Hauck | .................. | H01M 2/206 429/158 |
| 2012/0323511 A1 | 12/2012 | Saigo et al. | | |
| 2012/0328919 A1 | 12/2012 | Laderer et al. | | |
| 2013/0002016 A1 | 1/2013 | Furukawa et al. | | |
| 2013/0095356 A1* | 4/2013 | Shimizu | .............. | H01M 2/1077 429/88 |
| 2013/0244499 A1 | 9/2013 | Heck et al. | | |

FOREIGN PATENT DOCUMENTS

| | | |
|---|---|---|
| DE | 10 2010 023 934 | 12/2011 |
| DE | 10 2011 079 895 | 1/2013 |
| DE | 10 2012 205 020 | 10/2013 |
| EP | 2 565 957 | 3/2013 |
| EP | 2 605 028 | 6/2013 |
| WO | WO 2010/031856 | 3/2010 |
| WO | WO 2012/011237 | 1/2012 |

\* cited by examiner

METHOD FOR PRODUCING A BATTERY CONTACT-MAKING SYSTEM, AND BATTERY CONTACT-MAKING SYSTEM

CROSS-REFERENCE TO RELATED APPLICATIONS

The present application is a continuation of international application number PCT/EP2014/057133, filed on Apr. 9, 2014, which claims priority to German patent application number 10 2013 207 356.9 filed Apr. 23, 2013, the entire specification of both being incorporated herein by reference.

FIELD OF THE DISCLOSURE

The present invention relates to a cell contact-making system for an electrochemical device.

A cell contact-making system of this kind preferably includes a current conductor system having one or more cell connectors, for electrically conductively connecting cell terminals of different electrochemical cells, and a signal conductor system having one or more signal conductors for electrically conductively connecting a signal source to a signal conductor terminal connector of the cell contact-making system.

A cell contact-making system of this kind serves on the one hand to enable a power current to flow from and to the electrochemical cells of the electrochemical device, by means of the current conductor system, and on the other to perform individual cell monitoring for physical measured variables such as voltage and temperature, by means of the signal conductor system. For this purpose, potential differences for example are measured between different cell connectors and/or temperatures are detected in the vicinity of the cell connectors by means of suitable temperature sensors. The signal sources or measuring points are electrically conductively connected by the signal conductor system to the signal conductor terminal connector, which serves as the interface for the monitoring unit of the electrochemical device.

BACKGROUND

In the case of known cell contact-making systems, the cell connectors usually take the form of flexible punched parts or litz wires having cable lugs.

In known cell contact-making systems, the signal conductor terminal connector is either soldered onto a printed circuit board, or is part of a wiring harness.

When a printed circuit board is used, it is frequently necessary to coat the cell connector laboriously before it can be soldered to a conductor track of the printed circuit board.

The production and processing of a wiring harness are complex and costly, since they require manual interventions. Further, during the production of a cable harness, faults may occur as a result of incorrect allocation of the conductors of the wiring harness.

SUMMARY OF THE INVENTION

An object of the present invention is to provide a method for producing a cell contact-making system which is executable in a simple manner and which enables a reliable signal conductor system with precise positioning to be produced.

According to the invention, this object is achieved by a method for producing a cell contact-making system for an electrochemical device, which includes the following:

separating out from a starting material at least one signal conductor track group, which includes at least two signal conductor tracks of a signal conductor system of the cell contact-making system and at least one connection element by means of which at least two of the signal conductor tracks are connected to one another;

connecting the signal conductor tracks of the signal conductor track group to a respective cell connector, cell terminal connector or sensor element of the cell contact-making system;

removing the at least one connection web.

The present invention is based on the concept of producing a plurality of signal conductor tracks of a signal conductor system of the cell contact-making system jointly and handling them as a unit until the signal conductor tracks have been arranged in the desired positions in a separating tool or on a support element of the cell contact-making system, in particular on a support plate, and/or until they have been connected, preferably in a substance-to-substance bond, to the respectively associated signal source—that is to say to a respective cell connector, cell terminal connector or sensor element of the cell contact-making system—and then severing and removing the at least one connection element from the signal conductor tracks in order to electrically isolate from one another the different signal conductor tracks.

In the method according to the invention, the at least one connection web may be removed before or after the signal conductor tracks of the signal conductor track group have been connected to a respective cell connector, cell terminal connector or sensor element of the cell contact-making system.

For example, at least one signal conductor track group that has been separated out from the starting material may be laid in a separating tool, in which at least one connection element is removed, whereupon signal conductor tracks of the signal conductor track group are transferred to the support element separately from one another, by an assembly operative or by means of a handling device, in particular a gripper device, and are then connected to a respective cell connector, cell terminal connector or sensor element of the cell contact-making system.

In the case of this variant, preferably no holes are required in the support element at the points corresponding to the disconnection points of the connection elements in the signal conductor track group.

As an alternative or in addition thereto, it may also be provided for at least one signal conductor track group to be positioned directly on the support element, whereupon signal conductor tracks of the signal conductor track group are electrically disconnected from one another by the removal of at least one connection element and are connected to a respective cell connector, cell terminal connector or sensor element of the cell contact-making system.

In the case of this variant, preferably holes are provided in the support element at the points corresponding to the disconnection points of the connection elements in the signal conductor track group, so that the respective connection element may be severed there by means of a separating tool that passes through the respective hole.

There is further the possibility of removing at least one connection element of the signal conductor track system once the signal conductor track group, separately from the support element, has been arranged in a separating tool and of removing at least one further connection element once the signal conductor track group has been arranged on the support element.

The method according to the invention for producing a cell contact-making system is preferably carried out fully automatically, and so represents a very low-cost solution.

Moreover, the possibility of faults caused by incorrect allocation of the signal conductor tracks to the signal sources and/or to the plug contacts of the signal conductor terminal connector of the signal conductor system is eliminated.

In a preferred embodiment of the invention, it is provided for the signal conductor tracks of the signal conductor system on the one hand and the cell connectors and/or cell terminal connectors of the cell contact-making system on the other to differ from one another in respect of their material and/or their material thickness.

Thus, it is preferably provided for the signal conductor tracks to be formed from a starting material that contains copper. This starting material may in particular be copper or a copper alloy. A material of this kind has high strength and resistance to corrosion.

By contrast, it is preferably provided for the cell connectors and/or cell terminal connectors of the cell contact-making system to be formed from a starting material that contains aluminum. Preferably, aluminum or an aluminum alloy is used as the starting material for the cell connectors and/or cell terminal connectors.

Since the signal currents to be carried by the signal conductor tracks are typically smaller than the power currents to be carried by the current conductor system, it is preferably provided for the material thickness of the signal conductor tracks of the signal conductor system to be less than the material thickness of the cell connectors and/or the material thickness of the cell terminal connectors of the cell contact-making system.

The starting material for the cell connectors and/or cell terminal connectors of the cell contact-making system preferably substantially corresponds to a material from which cell terminals of electrochemical cells of the electrochemical device are made.

Preferably, electrical contact is made between the cell connectors and/or cell terminal connectors of the cell contact-making system on the one hand and the cell terminals of the electrochemical cells of the electrochemical device on the other by a substance-to-substance bond, in particular by welding, for example by laser welding.

As an alternative thereto, the connection between the cell connectors or cell terminal connectors of the cell contact-making system on the one hand and the cell terminals of the electrochemical cells on the other may also be made with positive engagement, for example by screwing.

The current conductor system of the cell contact-making system may be produced from individual cell connectors and/or cell terminal connectors, in which case identical parts can be used a plurality of times.

As an alternative thereto, however, it is also possible to use a current conductor group for producing the current conductor system.

For this purpose, the method according to the invention preferably includes the following:

separating out from a starting material a current conductor group which includes at least two cell connectors, for electrically conductively connecting respectively second cell terminals of different electrochemical cells of the electrochemical device, and at least one connection element by means of which at least two of the cell connectors are connected to one another.

The current conductor group, which includes a plurality of cell connectors and may additionally include one or more cell terminal connectors, is thus produced as a unit and may be positioned as a unit on a support element, in particular a support plate, of the cell contact-making system.

The current conductor group or signal conductor track group may in principle be separated out from the respective starting material in any desired manner, for example by being cut out (for example by laser cutting) or punched out.

A current conductor group or signal conductor track group that is produced by being punched out may also be designated a lead frame.

In order to reduce material consumption it may be provided for the current conductor system of the cell contact-making system to be produced from a plurality of separate current conductor groups.

Similarly, in order to reduce material consumption it may be provided for a signal conductor system of the cell contact-making system to be produced from a plurality of separate signal conductor track groups.

Further, it may be provided for the cell contact-making system to include a plurality of signal conductor systems each having a signal conductor terminal connector, wherein each of these signal conductor systems may respectively be produced from a single signal conductor track group or a plurality of signal conductor track groups.

In a preferred embodiment of the invention, it is provided for the signal conductor track group to include, in addition to the signal conductor tracks, at least one terminal connector pin or plug contact of a signal conductor terminal connector of the signal conductor system. Preferably, at least one terminal connector pin or plug contact is formed in one piece with at least one signal conductor track of the signal conductor track group.

As an alternative thereto, it may also be provided for the signal conductor track group on the one hand and the terminal connector pins or plug contacts of the signal conductor terminal connector on the other to be produced separately.

In this case, it is in particular possible to use as the signal conductor terminal connector a prefabricated plug that does not have terminal connector pins integrated in the signal conductor track group.

These terminal connector pins may for example be connected to the plug housing by injection molding the material of the plug housing around the terminal connector pins, in an injection molding tool.

The terminal connector pins of the plug housing may project beyond the plug housing on one side and form, with the associated signal conductor tracks, an overlap region in which the terminal connector pins and the signal conductor tracks are connected to one another by a substance-to-substance bond, in particular by welding, soldering or pressing, for example by crimping.

When a signal conductor terminal connector having its own terminal connector pins which are produced separately from the signal conductor track group is used, the requirements made of the terminal connector pins in respect of precision, press-out forces and surface finish may be fulfilled particularly simply.

At least one terminal connector pin or plug contact of the signal conductor terminal connector is preferably connected to a plug housing of the signal conductor terminal connector.

The plug housing may be made in one or more parts.

One or more parts of the plug housing may be a component of a support element or a component of a cover element of the cell contact-making system.

The connection between the terminal connector pin or plug contact on the one hand and the plug housing on the other may be made for example by pressing or by injection molding around the terminal connector pin or plug contact in an injection molding tool.

The terminal connector pins or plug contacts of the signal conductor terminal connector are preferably made from a material that contains copper. This material may in particular be copper or a copper alloy. A material of this kind has high strength and resistance to corrosion.

At least one signal conductor track of the signal conductor track group is preferably connected to at least one cell connector or at least one cell terminal connector of the cell contact-making system by a substance-to-substance bond, in particular by welding, for example ultrasound welding, soldering or adhesion, or with positive engagement, for example by crimping.

Further, preferably at least one signal conductor track of the signal conductor track group is connected to a temperature sensor which preferably includes an NTC (negative temperature coefficient) element. This connection is preferably made by a substance-to-substance bond, in particular by welding or soldering.

Further, it may be provided for the starting material for the signal conductor track group and/or the starting material for the current conductor group to be provided at least partly, preferably substantially over its entire surface, with a coating.

A coating of this kind may in particular contain nickel.

As a result of a coating of this kind, making electrical contact between the current conductor system and the signal conductor system, making electrical current between the current conductor system and the cell terminals of the electrochemical cells and/or making electrical contact between the signal conductor system and the terminal connector pins or plug contacts of the signal conductor terminal connector may be simplified.

In a preferred embodiment of the invention, it is provided for the signal conductor track group to be fixed to a support element of the cell contact-making system, in particular a support plate, before the signal conductor tracks are connected to a respective cell connector, cell terminal connector or sensor element of the cell contact-making system.

This fixing may be performed for example by caulking.

If a current conductor group is used to produce the current conductor system, then preferably the current conductor group is also fixed to a support element, in particular a support plate, of the cell contact-making system before connection to the signal conductor tracks of the signal conductor track group, for example by caulking.

The support element preferably has at least one passage opening which enables access to a contact point between the signal conductor track group on the one hand and a cell connector, cell terminal connector and/or sensor element of the cell contact-making system on the other. This makes it possible in a simple manner to make an electrical contact between the signal conductor system and the current conductor system, through the passage opening in the support element.

Once the cell connectors and/or cell terminal connectors of the cell contact-making system have been connected to the signal conductor tracks of the signal conductor system, the cell connectors and/or cell terminal connectors and signal conductor tracks are preferably covered by means of a cover element in order to prevent undesired contact of these elements in the cell contact-making system during assembly of the electrochemical device or during transport and operation of the electrochemical device.

Further, the present invention relates to a cell contact-making system for an electrochemical device that includes a plurality of electrochemical cells, wherein the cell contact-making system includes at least one cell connector for electrically conductively connecting cell terminals of different electrochemical cells of the electrochemical device, and a signal conductor system having a plurality of signal conductor tracks which are connected to a respective cell connector, cell terminal connector or sensor element of the cell contact-making system.

A further object of the present invention is to provide a cell contact-making system of this kind which is producible as simply as possible and yet reliably and with precise positioning.

This object is achieved according to the invention in the case of the cell contact-making system of the above-mentioned type in that the signal conductor tracks are produced by separating out from a starting material a signal conductor track group, which includes at least two signal conductor tracks and at least one connection element connecting the signal conductor tracks to one another, connecting the signal conductor tracks of the signal conductor track group to a respective cell connector, cell terminal connector or sensor element of the cell contact-making system, and removing the at least one connection element.

Particular embodiments of the cell contact-making system according to the invention have already been explained above in the context of particular embodiments of the method according to the invention for producing a cell contact-making system.

The cell contact-making system according to the invention is particularly suitable for connection to an electrochemical device that takes the form of a battery, for example a lithium ion battery.

If the electrochemical device takes the form of a battery, it is particularly suitable as an energy source of high loading capacity, for example for driving motor vehicles.

Further features and advantages of the invention form the subject matter of the description below and the illustration in the drawings of an exemplary embodiment.

BRIEF DESCRIPTION OF THE DRAWINGS

Like or functionally equivalent elements are designated by the same reference numerals in all the Figures.

DETAILED DESCRIPTION OF THE INVENTION

Figure 1:
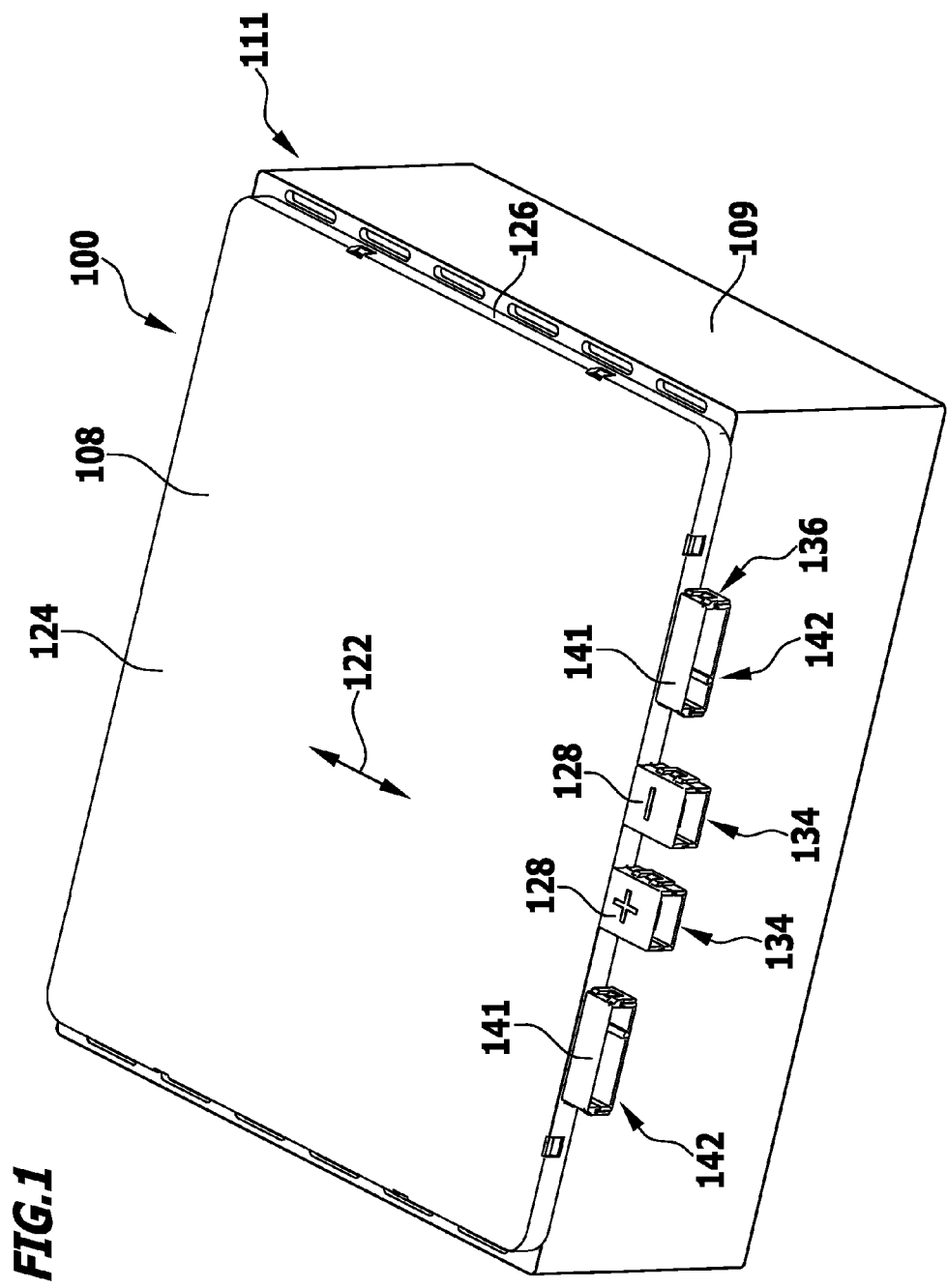
FIG. 1 shows a schematic perspective illustration of an electrochemical device having a housing and a plurality of electrochemical cells arranged therein, wherein a cell contact-making system is placed on the housing and is electrically conductively connected to cell terminals of the electrochemical cells.
Figure 2:
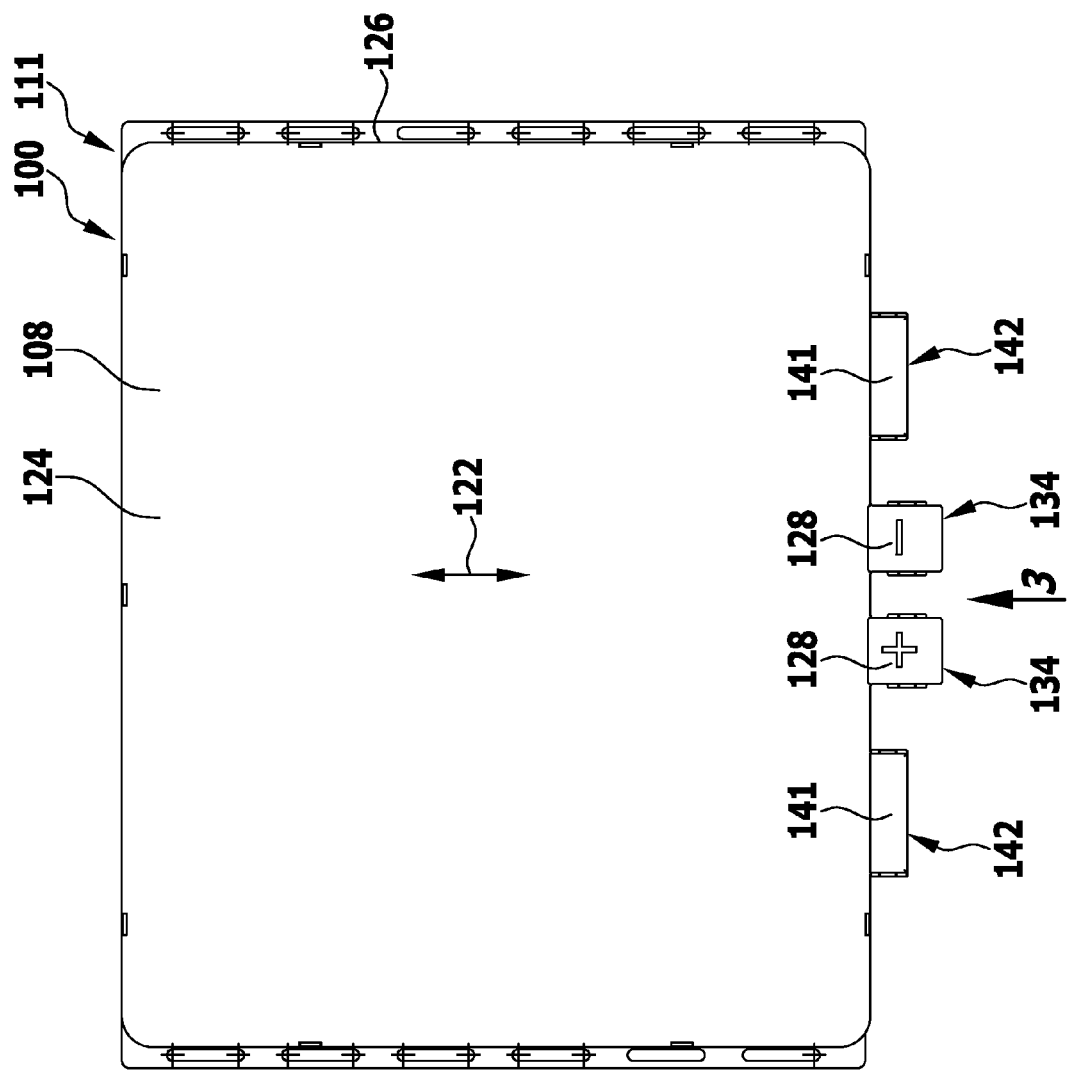
FIG. 2 shows a schematic plan view from above of the electrochemical device having the cell contact-making system from FIG. 1.
Figure 3:
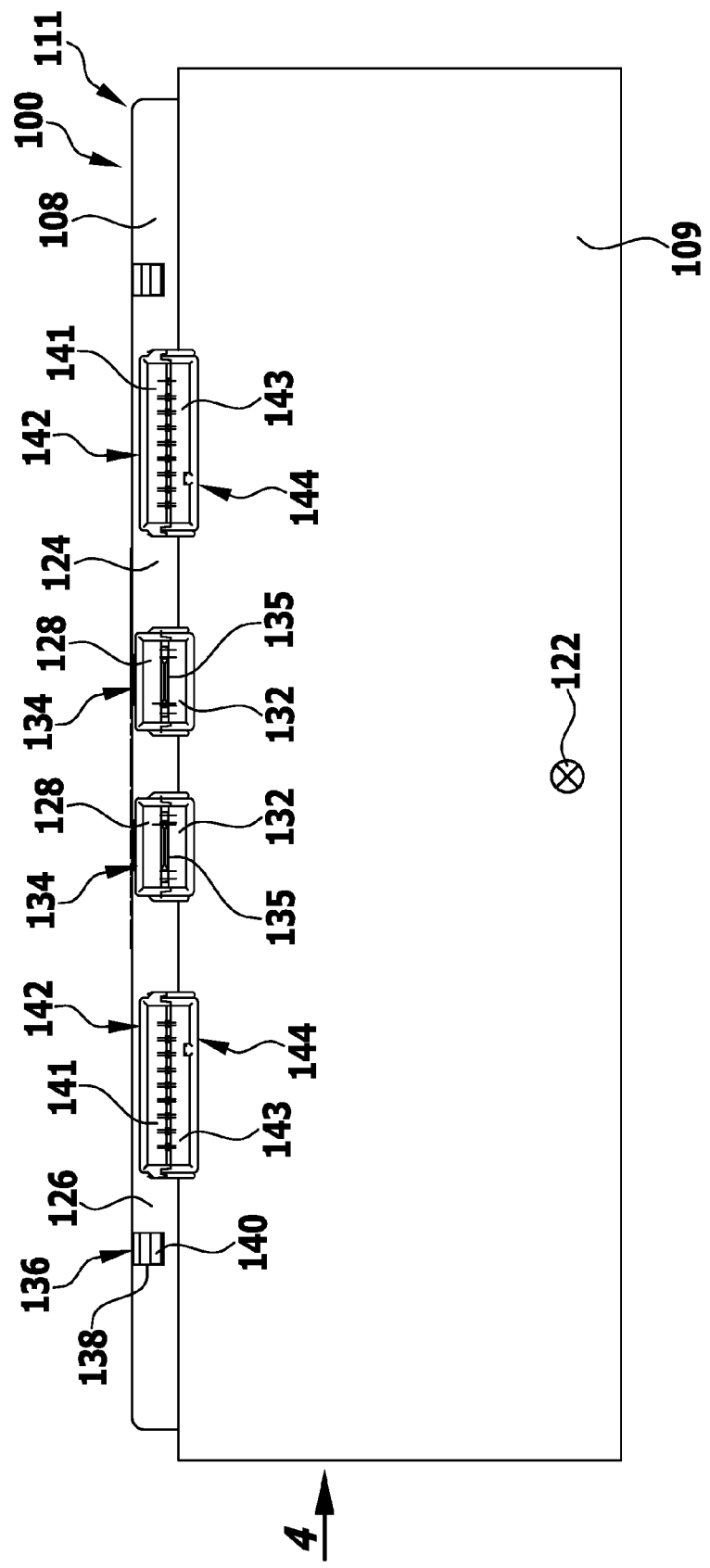
FIG. 3 shows a schematic front view of the electrochemical device having the cell contact-making system from FIGS. 1 and 2, with the direction of view in the direction of the arrow 3 in FIG. 2.

A cell contact-making system that is illustrated in FIGS. 1 to 6 and is designated 100 as a whole includes a support element 102, on which a current conductor system 104 and one or more signal conductor systems 106 are held, and a cover element 108 that is placeable on the support element 102.

Figure 17:
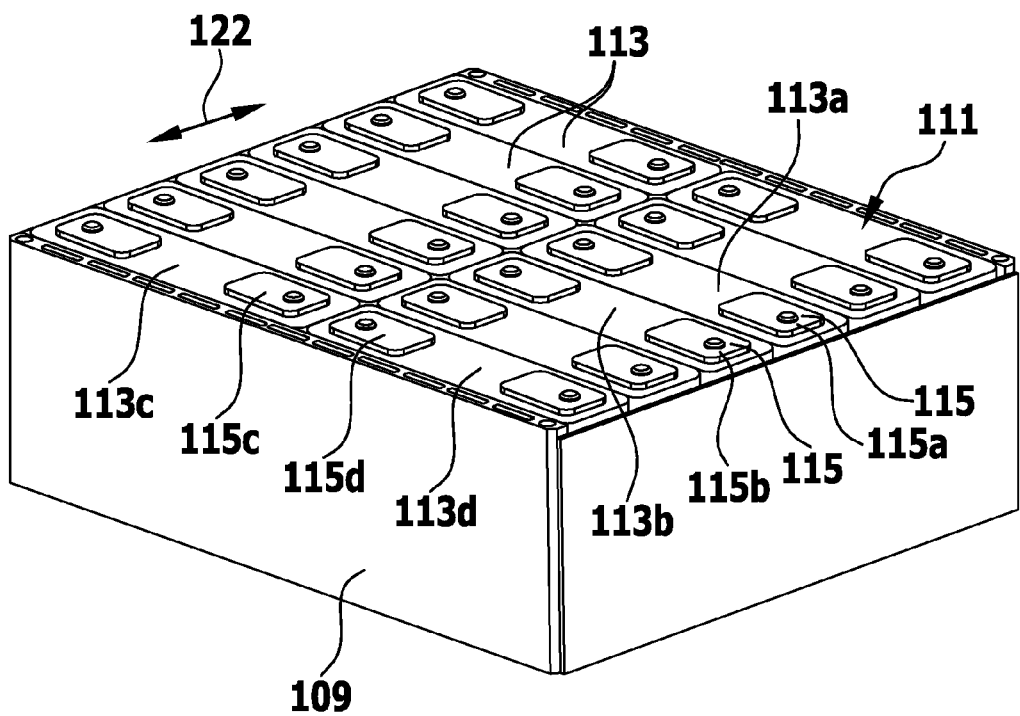
FIG. 17 shows a schematic perspective illustration of the housing of the electrochemical device with the electrochemical cells arranged therein.
Figure 18:
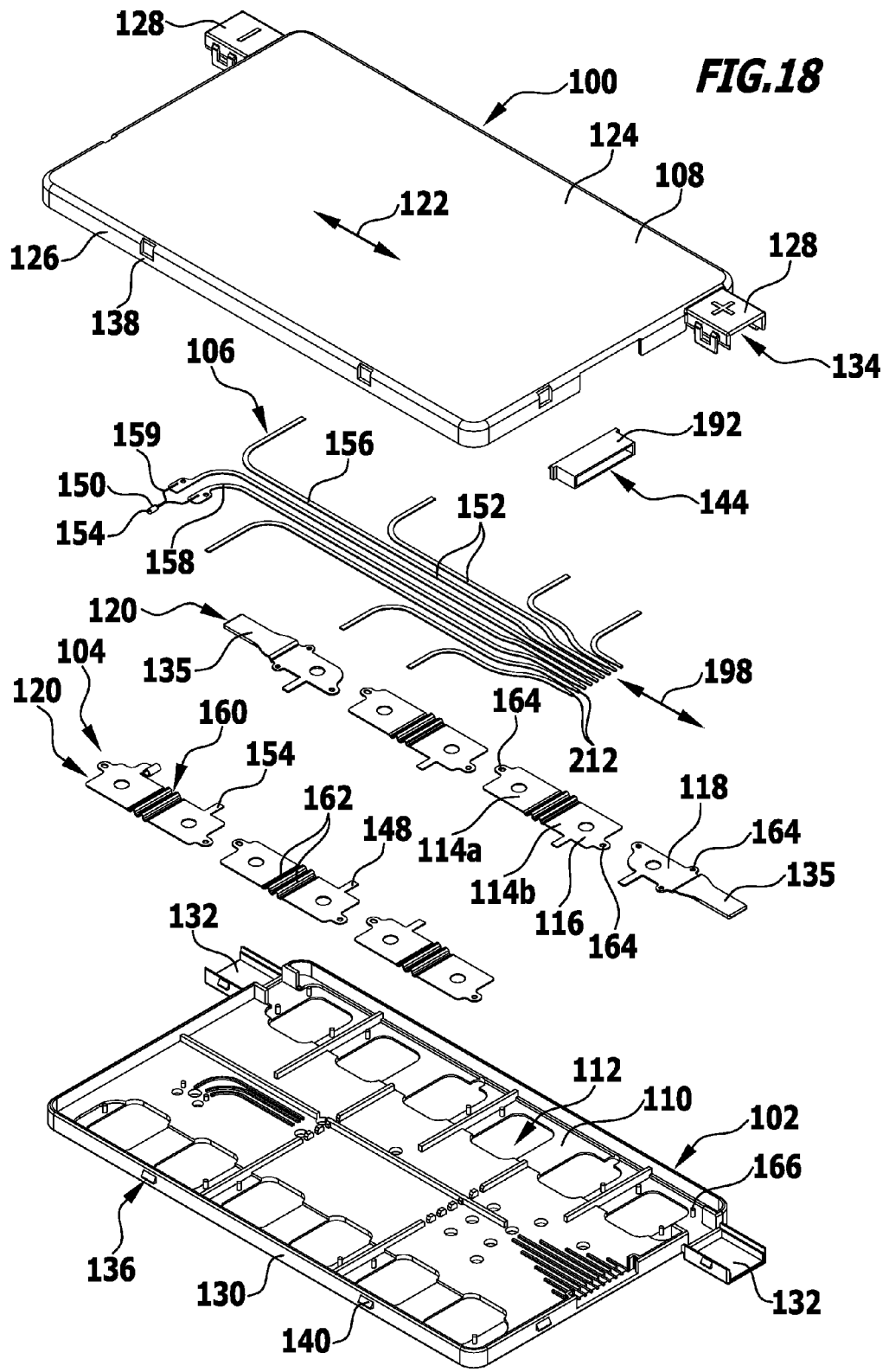
FIG. 18 shows a perspective exploded illustration of a second embodiment of the cell contact-making system, in which only a single signal conductor system is provided and the signal conductor terminal connector of the signal conductor system has terminal connector pins that are produced separately from the signal conductor track group.
Figure 19:
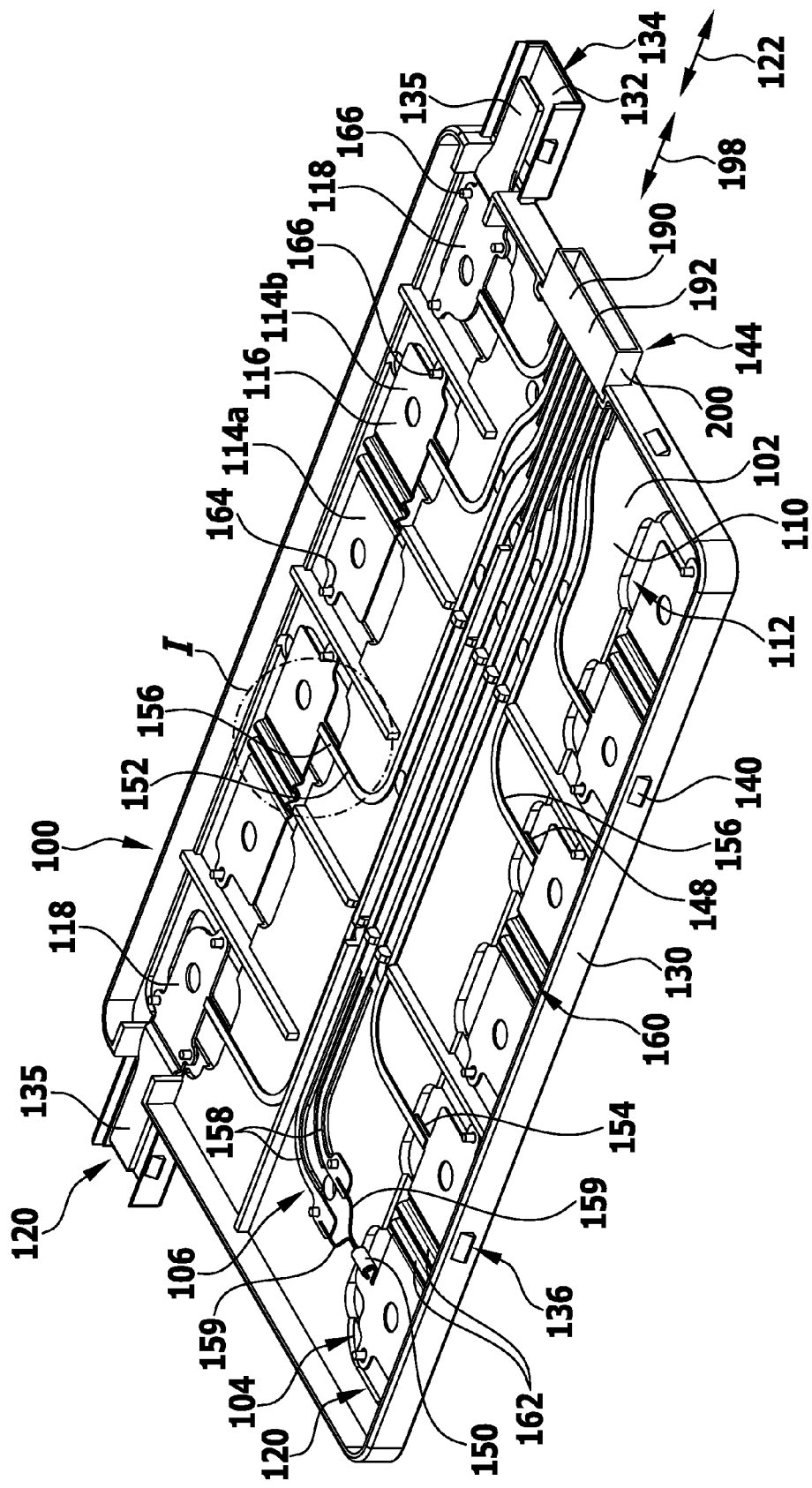
FIG. 19 shows a perspective illustration of the support element, the current conductor system and the signal conductor system of the cell contact-making system from FIG. 18.

The support element 102 is placeable on a housing 109 of an electrochemical device 111, for example a battery module, having a plurality of electrochemical cells 113, in particular battery cells, and in the mounted condition of the electrochemical device 111 closes off an upper housing opening through which cell terminals 115 of the electrochemical cells 113 of the electrochemical device 111 project (see FIG. 17).

Figure 7:
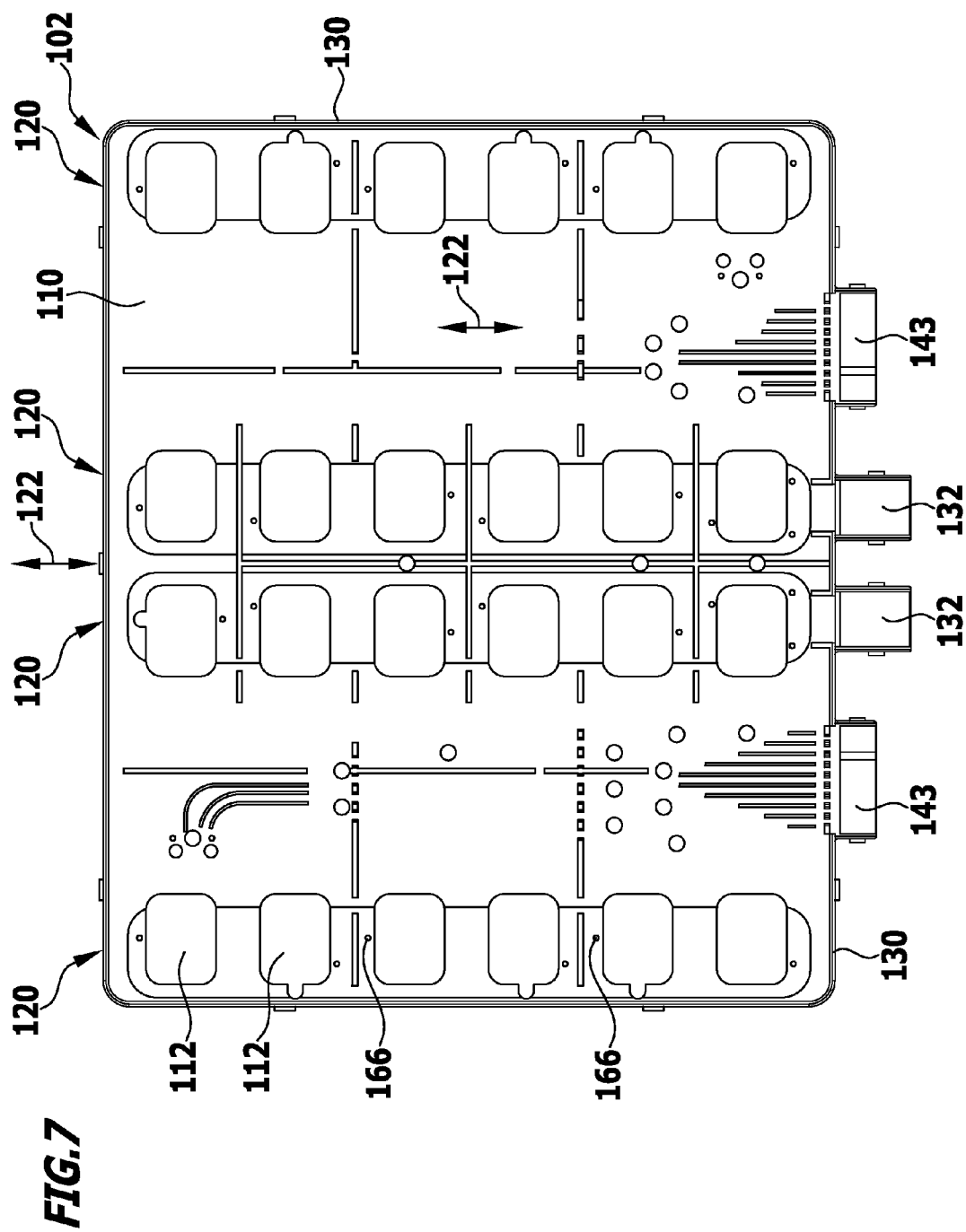
FIG. 7 shows a schematic plan view from above of a support element of the cell contact-making system before a current conductor system and signal conductor systems of the cell contact-making system have been connected to the support element.

The support element 102, which is illustrated individually in FIG. 7, may for example take the form of a preferably substantially rectangular support plate 110.

The support element 102 is provided with a plurality of passage openings 112, wherein each passage opening 112 is allocated on the one hand to a respective contact region 114 of a cell connector 116 or cell terminal connector 118 and on the other to a respective cell terminal 115 of the electrochemical cells 113 of the electrochemical device 111, with the result that a respective cell terminal 115 is connectable, through a passage opening 112 of this kind, to an associated contact region 114 of a cell connector 116 or cell terminal connector 118.

In so doing, a cell terminal 115 may for example extend through the passage opening 112 in order to come into contact with a contact region 114 of a cell connector 116 or cell terminal connector 118.

As an alternative thereto, a contact region 114 of a cell connector 116 or cell terminal connector 118 may also extend through the respectively associated passage opening 112 in order to come into contact with the respectively associated cell terminal 115.

Further, it is also conceivable for both the cell terminal 115 and also the contact region 114 of the cell connector 116 or cell terminal connector 118 to extend into the passage opening 112 and to be connected to one another there.

Figure 5:
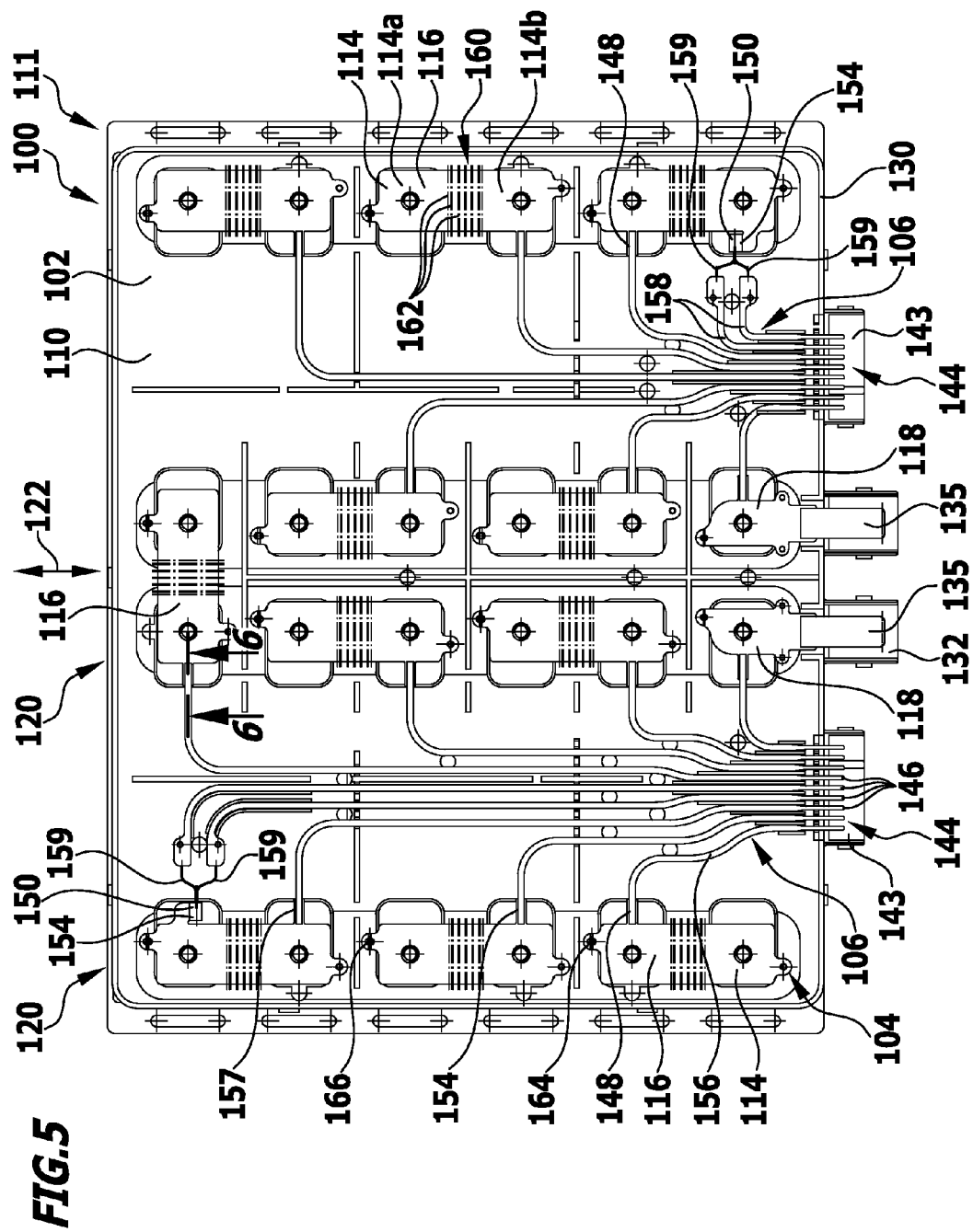
FIG. 5 shows a schematic plan view from above of the electrochemical device having the cell contact-making system from FIGS. 1 to 4, wherein a cover element of the cell contact-making system has been removed.
Figure 6:
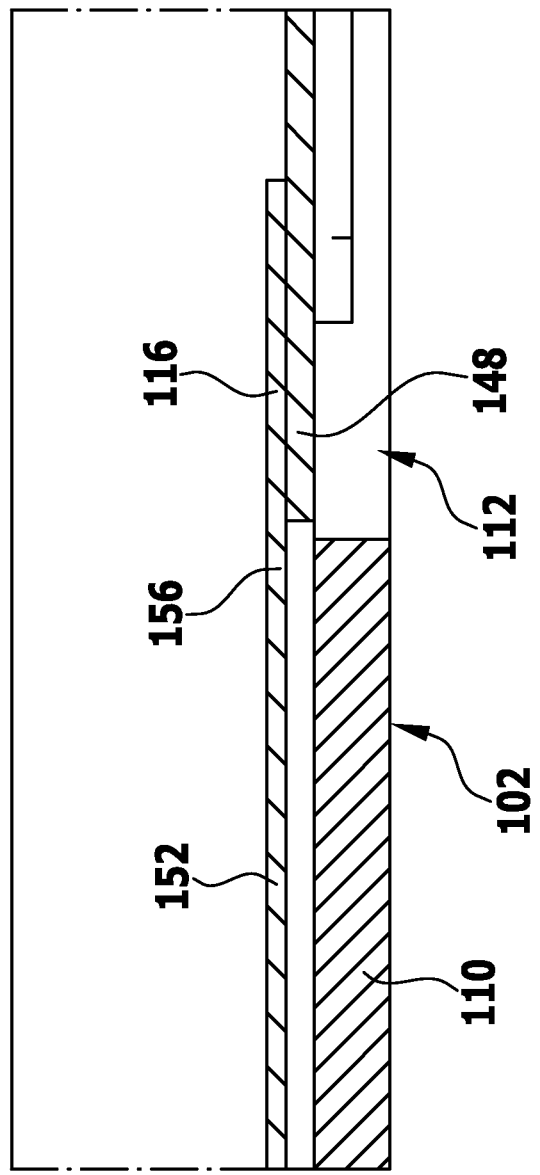
FIG. 6 shows a schematic longitudinal section through the cell contact-making system from FIG. 5, along the line 6-6 in FIG. 5.

As can be seen from FIGS. 5 and 7, the passage openings 112 of the support element 102 may be arranged in a plurality of rows 120, wherein the rows 120 extend for example in a longitudinal direction 122 of the support element 102.

The passage openings 112 may in particular take a substantially rectangular form, in particular with rounded corner regions; in principle, however, other shapes of the passage openings 112, in particular circular, oval, square or polygonal passage openings 112, are also possible.

The cover element 108, which serves to cover the current conductor system 104 and the signal conductor system 106, is arranged on the upper side of the support element 102, in the mounted condition of the cell contact-making system 100 remote from the electrochemical cells 113.

The cover element 108 for example takes the form of a substantially rectangular cover plate 124.

The cover element 108 and/or the support element 102 is/are preferably made from a thermoplastic material, for example polypropylene.

Preferably, the cover element 108 and/or the support element 102 is/are formed substantially entirely from a thermoplastic material, for example polypropylene.

Figure 4:
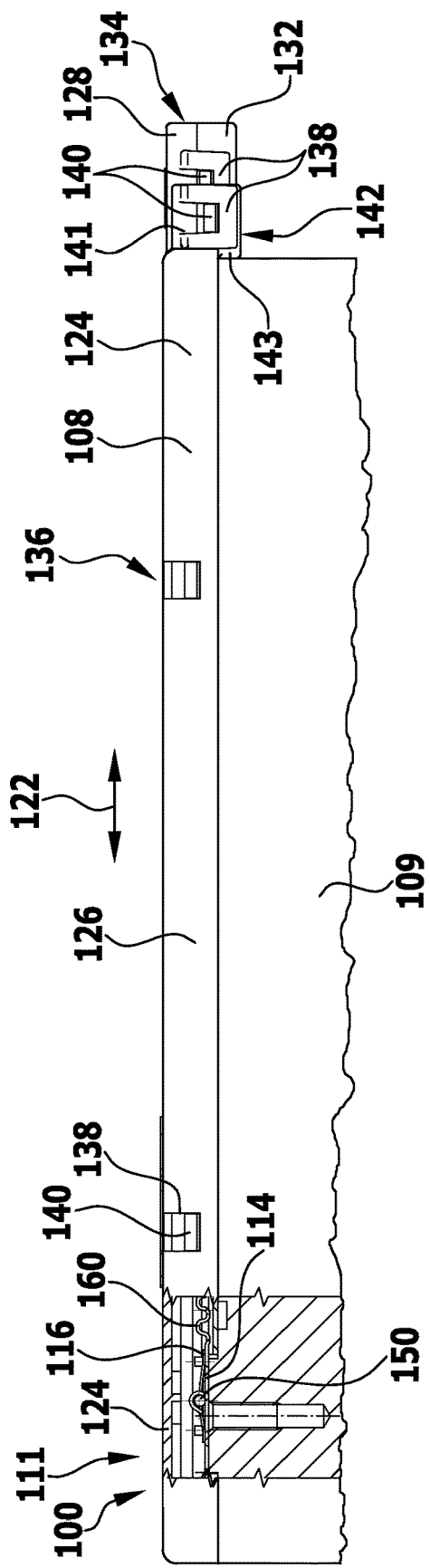
FIG. 4 shows a partly cut-away side view of a detail of the electrochemical device having the cell contact-making system from FIGS. 1 to 3, with the direction of view in the direction of the arrow 4 in FIG. 3.

As can best be seen from FIGS. 1 and 4, the cover element 108 is further preferably provided with an edge region 126 which runs around an outer edge and in the mounted condition of the cell contact-making system 100 projects towards the support element 102.

The edge region 126 of the cover element 108 may be interrupted by two passage channels 128 which project forwards or backwards from the edge of the cover element 108, preferably in the longitudinal direction 122, and may for example have a substantially U-shaped cross section.

As can best be seen from FIG. 7, the support element 102 is also preferably provided with an edge region 130 which runs around an outer edge and in the mounted condition of the cell contact-making system 100 projects towards the cover element 108.

The edge region 130 of the support element 102 may also be interrupted by two passage channels 132 which project forwards or backwards from the edge of the support element 102, preferably in the longitudinal direction 122, and may for example have a substantially U-shaped cross section.

The passage channels 132 of the support element 102 and the passage channels 128 of the cover element 108 are arranged at mutually corresponding points on the respective edge regions 130 and 126 and face one another with their open sides, with the result that the passage channels 132, 128 together form a respective passage duct 134 which serves to receive a respective current terminal connector 135 of the cell contact-making system 100.

Each current terminal connector is electrically conductively connected to a respective cell terminal connector 118 of the cell contact-making system 100.

The cell terminal connectors 118 and the cell connectors 116, by means of which the cell terminals 115 in each case of two mutually adjacent electrochemical cells 113 of different polarity are electrically conductively connectable to one another, together form the current conductor system 104 of the cell contact-making system 100.

The current conductor system 104 serves to enable current to flow between the electrochemical cells 113 of the electrochemical device 111 and to or from the cell terminal connectors 118 of the cell contact-making system 100.

As a result of this current conductor system 104, for example the electrochemical cells 113 of the electrochemical device 111 are connected electrically in series.

In this arrangement, each cell connector 116 connects a first cell terminal 115a, of negative polarity, of a first electrochemical cell 113a to a second cell terminal 115b, of positive polarity, of an adjacent second electrochemical cell 113b (see FIG. 17).

In each case, a cell terminal 115c of the electrochemical cell 113c that forms the start of the cell series circuit of the electrochemical device, and a cell terminal 115d of the electrochemical cell 113d that forms the end of the cell series circuit, are electrically conductively connected to one of the electrically conductive cell terminal connectors 118 of the cell contact-making system 100.

A plurality of electrochemical devices 111 each having a cell contact-making system 100 are preferably connected electrically in series.

A series circuit of this kind may in particular be produced in that a current terminal connector 135 of a first electrochemical device 111 is electrically conductively connected, by means of a module connector (not illustrated), to an electrical current terminal connector 135 (of the opposite polarity) of a second electrochemical device 111.

So that the cover element 108 may be releasably fixed to the support element 102, there is preferably provided a latching device 136 that includes one or more latching elements 138 provided on the cover element 108 and one or more latching elements 140 provided on the support element 102.

The latching elements 138 on the cover element and the latching elements 140 on the support element are arranged at mutually corresponding points on the edge region 126 of the cover element 108 and the edge region 130 of the support element 102 respectively and latch to one another when the cover element 108 is placed on the support element 102, with the result that the cover element 108 is held releasably on the support element 102 by means of the latching device 136.

Further, the cover element 108 and the support element 102 are preferably provided, on their respective edge regions 126 and 130, with one or more passage channels 141 and 143 respectively that in respective pairs form a terminal connector duct 142 through which a respective signal conductor terminal connector 144 (see in particular FIG. 5) having a plurality of plug contacts or terminal connector pins 146 is accessible from outside the cell contact-making system 100 for making contact with a signal conductor element that is complementary with the signal conductor terminal connector 144.

The signal conductor terminal connector 144 may for example take the form of a signal conductor plug.

In this case, the signal conductor element, which takes a form complementary with the signal conductor terminal connector 144, preferably takes the form of a signal conductor socket.

Each signal conductor terminal connector 144 serves to connect the respectively associated signal conductor system 106 arranged on the support element 102 to a monitoring unit (not illustrated) of the electrochemical device 111 by way of a preferably multiple-pole connection line (not illustrated).

Each signal conductor system 106 serves to connect one or more voltage tapping points 148 to a respective cell connector 116 or cell terminal connector 118 and/or to connect one or more temperature sensors 150 of the cell contact-making system 100 to the respective signal conductor terminal connector 144.

The signal conductor system 106 includes a plurality of signal conductor tracks 152 that electrically conductively connect a respective signal source 154 to the respectively associated signal conductor terminal connector 144.

If the signal source 154 is a voltage tapping point 148 on a cell connector 116 or cell terminal connector 118, then this signal source 154 is connected to the signal conductor terminal connector 144 by way of a voltage tapping conductor track 156.

The voltage tapping points 148 are connected to a respective contact region 114 of a cell connector 116 or cell terminal connector 122 of the cell contact-making system 100, in order to be able to tap the electrical potential respectively prevailing there.

So that a substance-to-substance bond may be made in a simple manner between the voltage tapping points 148 and the voltage tapping conductor tracks 156, the voltage tapping points 148 preferably take the form of projections 157 from the cell connectors 116 or cell terminal connectors 118, which overlap with an end region of a voltage tapping conductor track 156.

If the signal source 154 is a temperature sensor 150, the signal source 154 is electrically conductively connected to the signal conductor terminal connector 144 by means of one or more temperature measuring conductor tracks 158.

In this arrangement, the temperature sensor 150 may be connected to each of the temperature measuring conductor tracks allocated thereto, by means of a respective terminal connector line 159.

The temperature sensors 150 are preferably also in contact with a contact region 114 of a cell connector 116 or cell terminal connector 118 of the cell contact-making system 100, in order to be able to measure the temperature prevailing there.

Each of the contact regions 114 of the cell connectors 116, and each cell terminal connector 118, is allocated to a respective cell terminal 115 of the electrochemical device 111 and, in the mounted condition of the electrochemical device 111, is electrically conductively connected, preferably by a substance-to-substance bond, to the respectively associated cell terminal 115.

Each cell connector 116 includes two contact regions 114 for making electrical contact between a respective cell terminal 115 and a compensation region 160 that connects the two contact regions 114 to one another. The compensation region 160 is preferably elastically and/or plastically deformable in order to enable a relative movement of the two contact regions 114 of the cell connector 116 in relation to one another during operation of the electrochemical device 111 and/or for the compensation of tolerances when the cell contact-making system 100 is assembled.

For this purpose, the compensation region 160 may in particular have one or more compensation corrugations 162 that run transversely to a connection direction that connects a center of the first contact region 114*a* and a center of the second contact region 114*b* of the cell connector 116 to one another.

Figure 8:
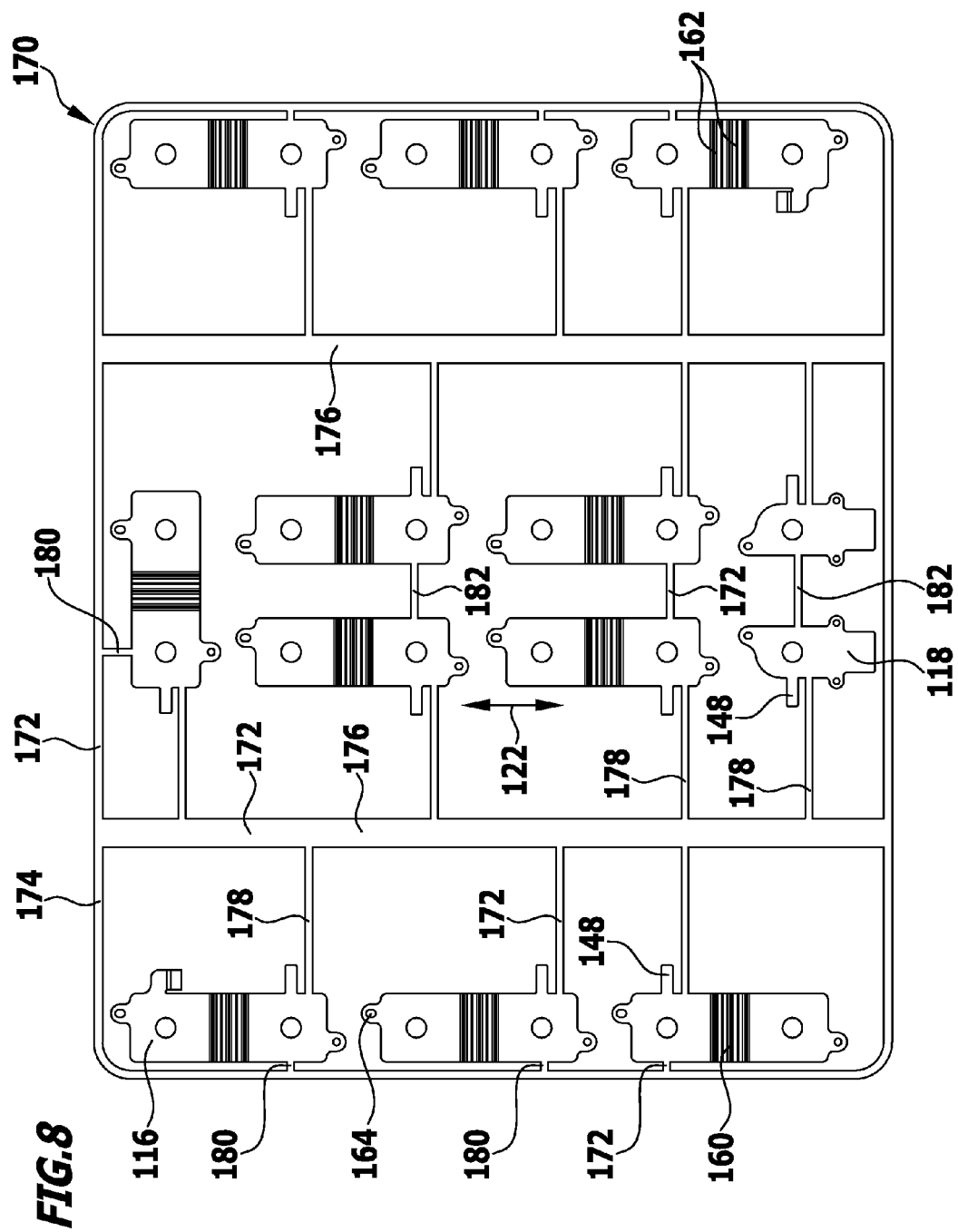
FIG. 8 shows a schematic plan view from above of a current conductor group which contains the cell connectors of the cell contact-making system and the cell connectors of mutually connecting connection elements.

Each contact region 114 of a cell connector 116 or cell terminal connector 118 may be positioned, by means of a respective positioning hole 164, on a respectively allocated positioning pin 166 on the support element 102 (see in particular FIGS. 7 and 8).

In this arrangement, the positioning pin 166 on the support element 102 preferably passes through the respectively allocated positioning hole 164 in the cell connector 116 or cell terminal connector 118.

The support element 102 is preferably made from an electrically non-conductive synthetic material, for example PBT (polybutylene terephthalate), PP (polypropylene), PA (polyamide), ABS (acrylonitrile butadiene styrene) and/or LCP (liquid crystal polymer), and is preferably formed substantially entirely from a synthetic material of this kind.

A particularly suitable material for the support element 102 is a polypropylene material with talcum filler (for example the material designated PP TV20). As a result of the talcum filler, this material has particularly good dimensional stability.

The cell contact-making system 100 described above is preferably pre-assembled complete, as a separate assembly of the electrochemical device.

During this pre-assembly, the components of the current conductor system 104, in particular the cell connectors 116 and cell terminal connectors 118, are positioned as a unit in the form of a current conductor group 170 (see FIG. 8) on the support element 102 and are connected thereto.

For this purpose, the current conductor group 170, which is illustrated individually in FIG. 8, is separated out from a starting material, for example from a metal starting material, in particular a sheet-metal material, for example by being punched out or cut out.

The current conductor group 170 includes the cell connectors 116 and the cell terminal connectors 118 of the cell contact-making system 100 in exactly the same relative positions as these components of the current conductor system 104 will adopt in the fully assembled condition of the cell contact-making system 100.

The cell connectors 116 and cell terminal connectors 118 are held in these relative positions by connection elements 172 which connect the cell connectors 116 and cell terminal connectors 118 to one another and are separated out of the starting material together therewith.

As can be seen from FIG. 8, these connection elements 172 may in particular include an outer connection frame 174 that surrounds the cell connectors 116 and cell terminal connectors 118 of the current conductor group 170 in the form of a ring.

Mutually opposing sides of the outer connection frame 174 may be connected to one another by principal connection webs 176 that preferably run parallel to the longitudinal direction 122 of the cell contact-making system 100.

Secondary connection webs 178 lead from these principal connection webs 176 to the cell connectors 116 and cell terminal connectors 118 of the current conductor group 170.

As an alternative or in addition thereto, the cell connectors 116 and/or cell terminal connectors 118 may be connected directly to the outer connection frame 174 by means of outer connection webs 180.

Further, it may be provided for cell connectors 116 and/or cell terminal connectors 118 of the current conductor group 170 to be connected directly to one another by intermediate connection webs 182.

Each cell connector 116 and each cell terminal connector 118 of the current conductor group 170 is connected to the other components of the current conductor group 170 by way of at least one connection web.

The stability of the current conductor group 170 is increased and handling thereof simplified if at least one cell connector 116 or cell terminal connector 118, preferably all the cell connectors 116 and cell terminal connectors 118, are connected to the other components of the current conductor group 170 by way of at least two connection webs.

As the starting material for producing the current conductor group 170, in principle any material may be used which has sufficient electrical conductivity for the cell connectors 116 and cell terminal connectors 118 produced therefrom to be able to carry a sufficiently large current during operation of the electrochemical device 111.

Preferably, the current conductor group 170 is made from a material that contains aluminum, in particular from aluminum or an aluminum alloy.

The current conductor group 170 is positioned on the support element 102 that is illustrated individually in FIG. 7 such that the positioning pins 166 of the support element 102 pass through the positioning holes 164 in the current conductor group 170.

In this position, the current conductor group is fixed to the support element 102, for example by caulking.

Before the current conductor group 170 is arranged on the support element 102, the compensation regions 160 on the cell connectors 116 are produced by a suitable forming procedure, for example a stamping procedure and/or a deep-drawing procedure.

Figure 9:
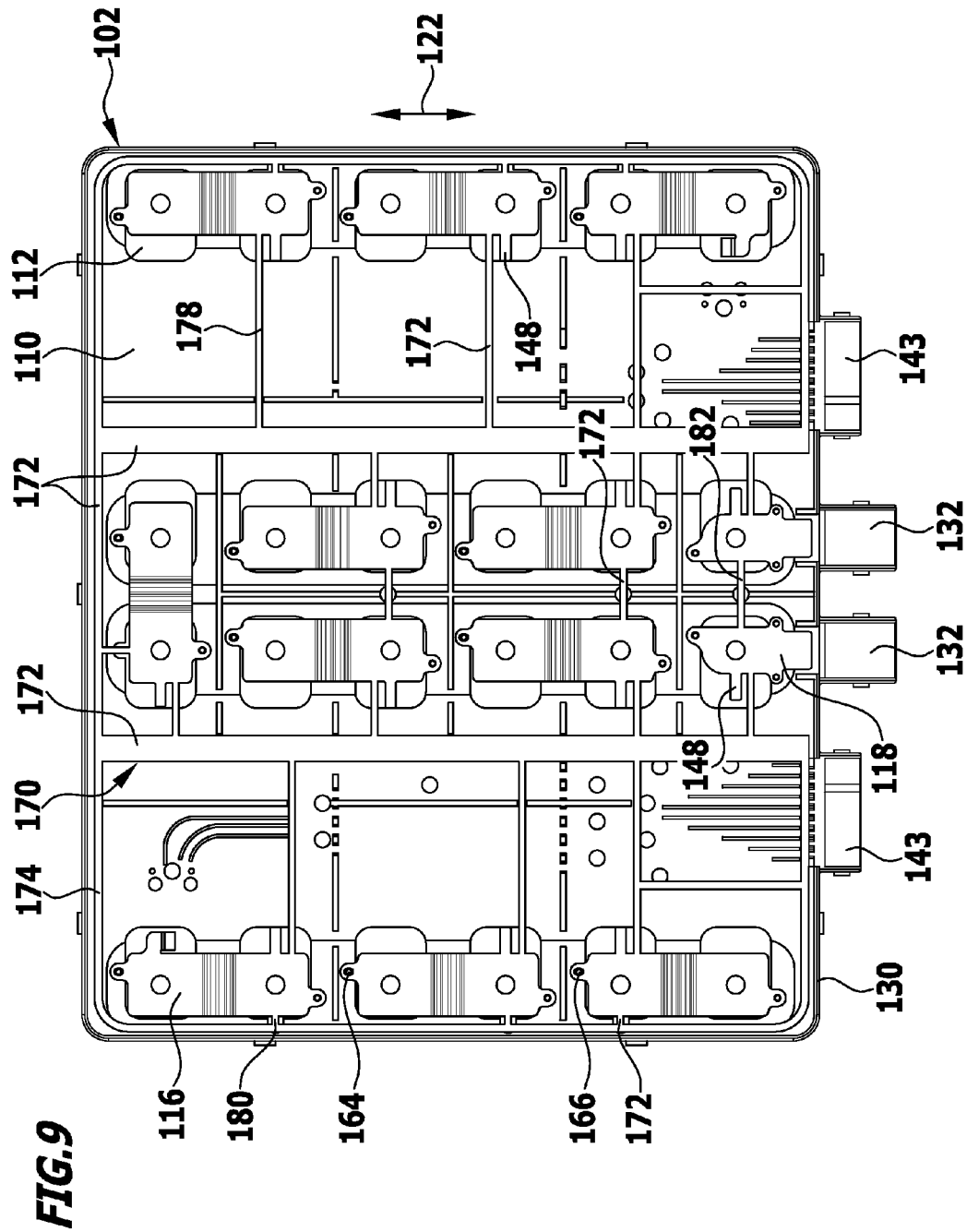
FIG. 9 shows a schematic plan view from above of the support element of the cell contact-making system after the current conductor group from FIG. 8 has been placed on the support element.

By this means, the intermediate condition of assembly illustrated in FIG. 9 is achieved.

Then, the connection elements 172 of the current conductor group 170—that is to say for example the outer connection frame 174, the principal connection webs 176, the secondary connection webs 178, the outer connection webs 180 and the intermediate connection webs 182—are severed from the cell connectors 116 and cell terminal connectors 118 of the current conductor system 104, for example by being punched out, and removed from the cell contact-making system 100.

Figure 10:
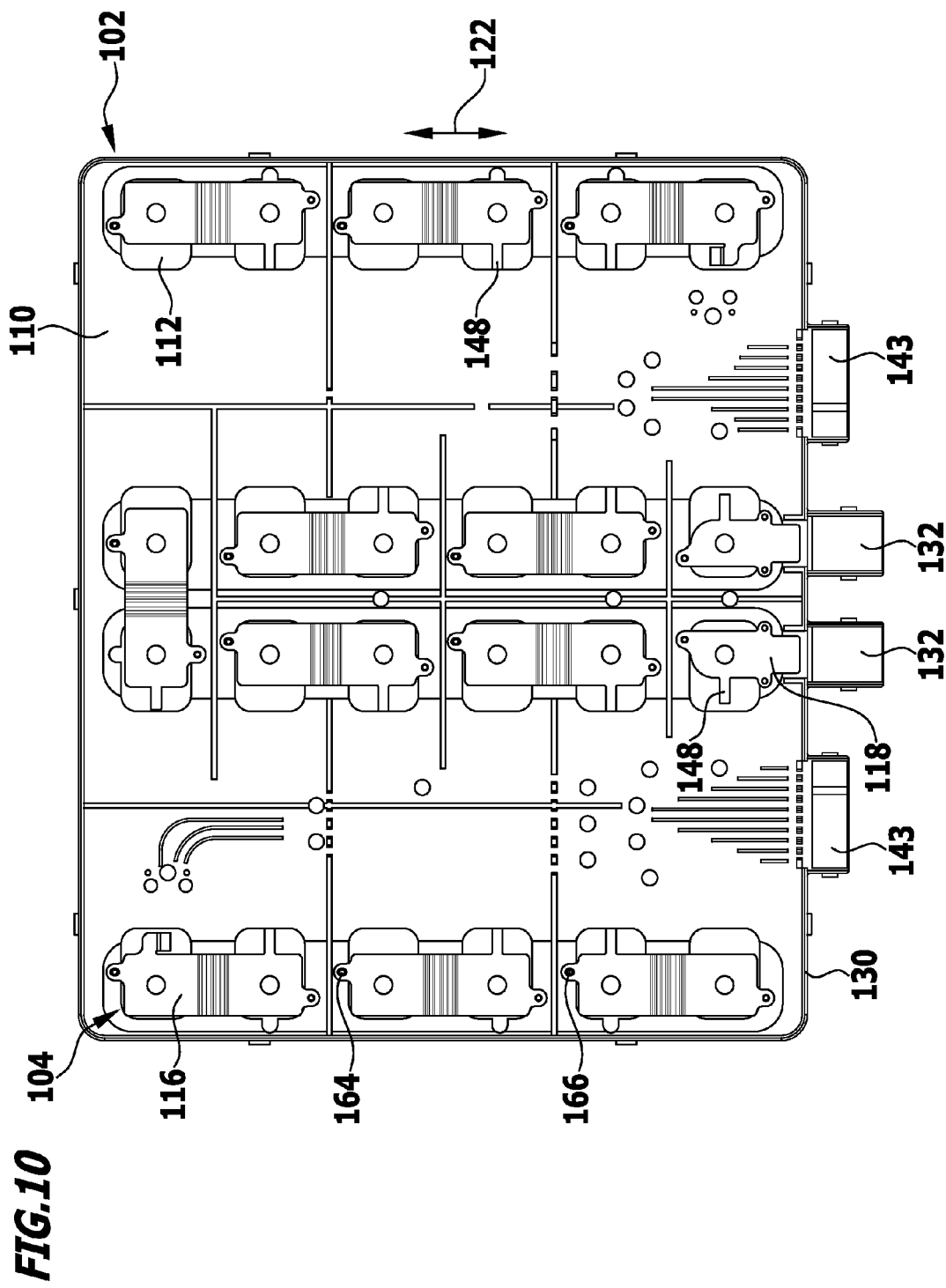
FIG. 10 shows a schematic plan view from above of the support element and the cell connectors arranged thereon after the connection elements of the current conductor group have been removed.

By this means, the intermediate condition of assembly illustrated in FIG. 10 is achieved.

Figure 11:
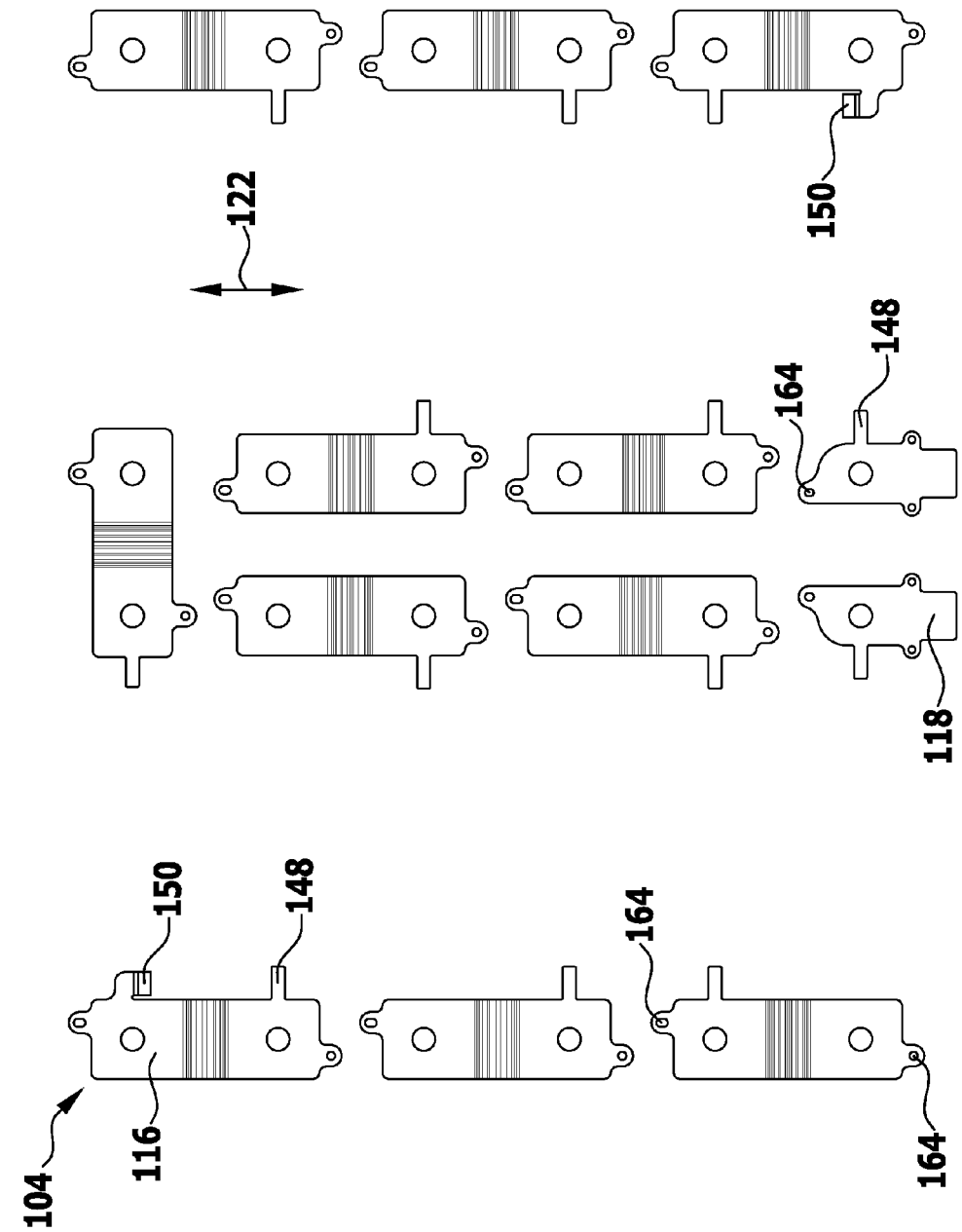
FIG. 11 shows a plan view from above of the cell connectors of the current conductor system after the connection elements of the current conductor group have been removed.

The cell connectors 116 and cell terminal connectors 118 that remain in the current conductor system 104 of the cell contact-making system 100 once the connection elements 172 of the current conductor group 170 have been removed are illustrated individually in FIG. 11, in their correct relative positions within the cell contact-making system 100.

Figure 12:
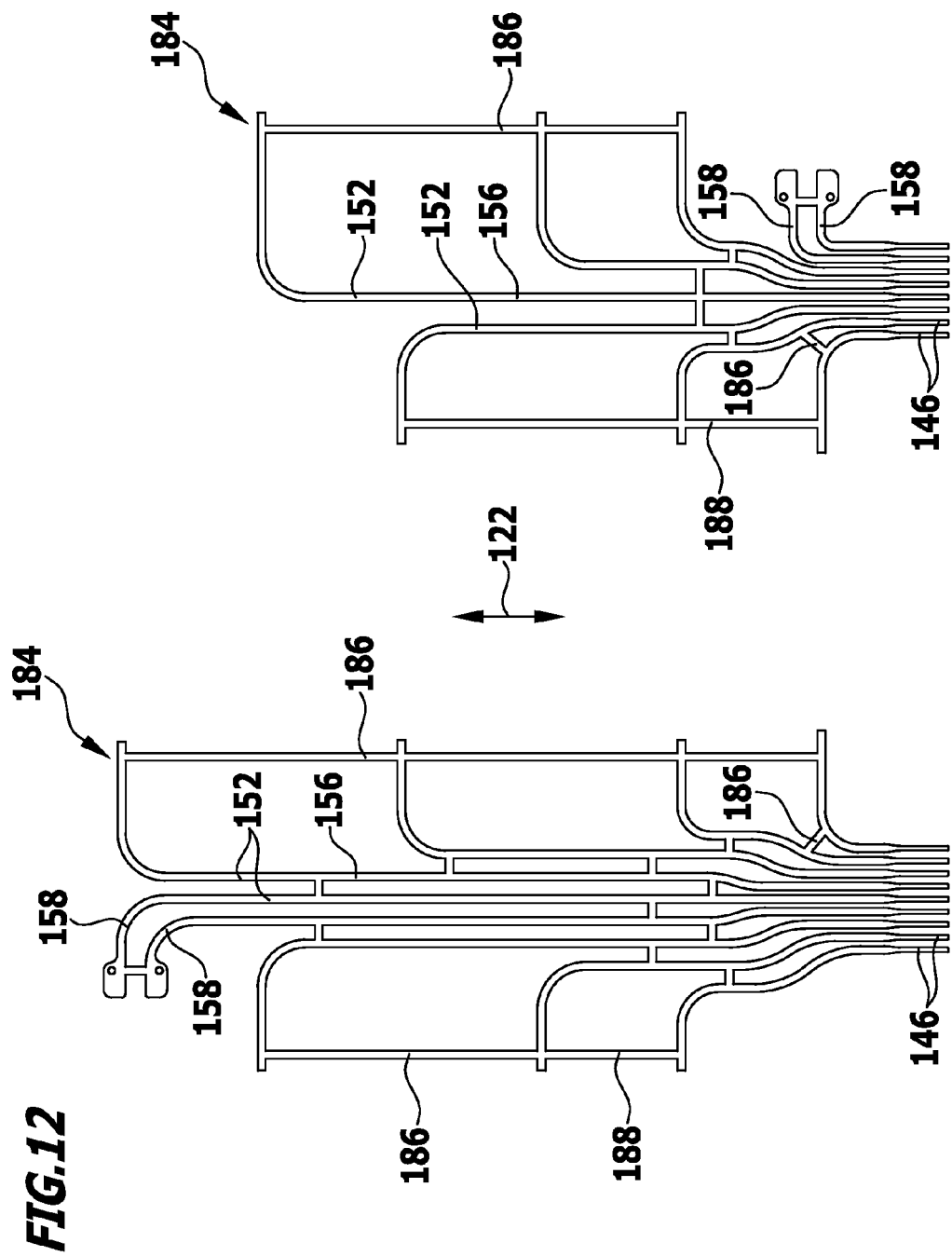
FIG. 12 shows a schematic plan view from above of two signal conductor track groups which each include a plurality of signal conductor tracks and connection elements that connect the signal conductor tracks to one another.

In a further method step, the components of the signal conductor systems 106 of the cell contact-making system 100, in particular the signal conductor tracks 152, are positioned on the support element 102 in the form of one or more signal conductor track groups 184, which are illustrated in FIG. 12.

In the exemplary embodiment illustrated in the drawing, two signal conductor systems 106, each having a signal conductor connection 144, are formed from a respective signal conductor track group 184.

As can be seen from FIG. 12, each signal conductor track group 184 includes the signal conductor tracks 152, in particular the voltage tapping conductor tracks 156 and the temperature measuring conductor tracks 158, of the respective signal conductor system 106, and connection elements 186, each of which connect two of these signal conductor tracks 152 to one another, with the result that, overall, all the signal conductor tracks 152 of a signal conductor track group 184 are connected to one another directly or indirectly by way of the connection elements 186 and form a jointly handlable unit.

Further, each signal conductor track 152 of the signal conductor track group 184 is formed in one piece with a plug contact or terminal connector pin 146.

Preferably, each signal conductor track 152 of a signal conductor track group 184 is connected by way of at least two connection elements 186, for example in the form of connection webs 188, to one or more other signal conductor tracks 152 of the signal conductor track group 184.

The signal conductor track groups 184 are separated out from a suitable starting material, for example from a metal starting material, in particular starting material in sheet-metal form, for example by being punched out or cut out.

As the starting material, in principle any material may be used which has sufficient electrical conductivity.

Preferably, there is used for the signal conductor track group 184 a starting material that contains copper, in particular copper or a copper alloy.

Since the currents flowing in the signal conductor system 106 are smaller than the currents flowing in the current conductor system 104, it is also possible in particular for the material thickness of the starting material of the signal conductor track group 184 and hence the material thickness of the signal conductor tracks 152 of the signal conductor system 106 to be different from the material thickness of the starting material of the current conductor group 170 and hence different from the material thickness of the cell connectors 116 and cell terminal connectors 118 of the current conductor system 104.

Preferably, the material thickness of the signal conductor track group 184 is less than the material thickness of the current conductor group 170.

The signal conductor tracks 152 of the signal conductor system 106 and the cell connectors 116 and/or cell terminal connectors 118 of the cell contact-making system 100 may thus differ from one another, in particular in respect of their material and/or their material thickness.

The signal conductor track groups 184 that have been separated out from the starting material are positioned on the support element 102 such that the end regions of the voltage tapping conductor tracks 156 overlap with the voltage tapping points 148 of the cell connectors 116 or cell terminal connectors 118, and the end regions of the temperature measuring conductor tracks 158 overlap with the end regions of the terminal connector lines 159 of the temperature sensors 150.

In this position, the signal conductor track groups 184 are fixed to the support element 102, for example by caulking.

Then, the mutually overlapping regions of the signal conductor track groups 184 on the one hand and the cell connectors 116, cell terminal connectors 118 and terminal connector lines 159 of the temperature sensors 150 on the other are connected to one another, preferably by a substance-to-substance bond, for example by ultrasound welding.

In order to make this connection possible, the regions that lie below the overlapping regions of the signal conductor track groups 184 having the cell connectors 116, cell terminal connectors 118 and terminal connector lines 159 of the temperature sensors 150 are preferably recessed in the support element 102.

Figure 13:
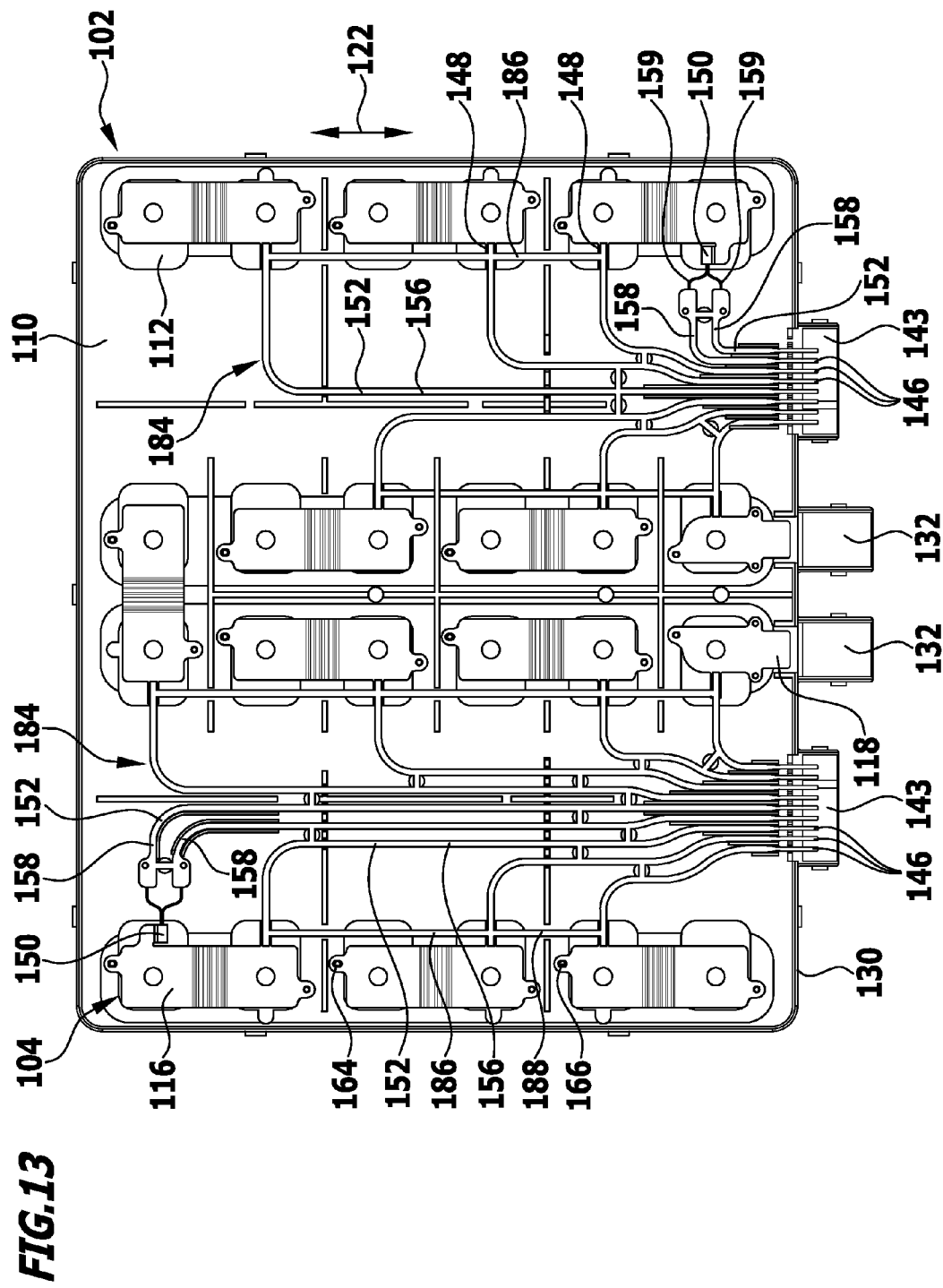
FIG. 13 shows a plan view from above of the support element of the cell contact-making system with the cell connectors, and with the signal conductor track groups from FIG. 12 placed on the support element.

By this means, the intermediate condition of assembly illustrated in FIG. 13 is achieved.

In a subsequent method step, the connection webs 188 of the signal conductor track groups 184 are severed from the signal conductor tracks 152, for example by being punched out, and are removed from the cell contact-making system 100.

Figure 14:
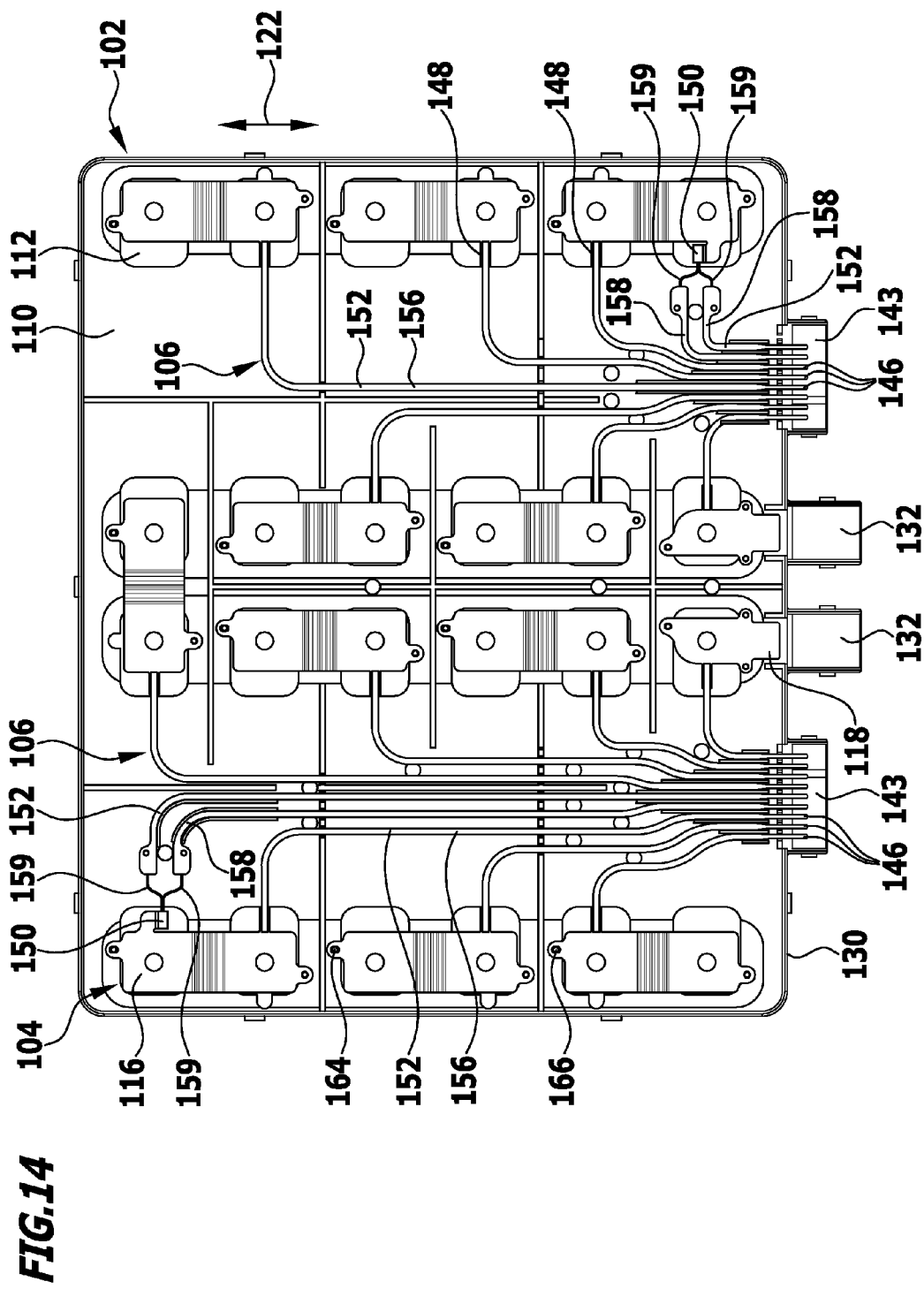
FIG. 14 shows a schematic plan view from above of the support element having the cell connectors and the signal conductor systems after the connection elements of the signal conductor track groups have been removed.

By this means, the intermediate condition of assembly illustrated in FIG. 14 is achieved.

Figure 15:
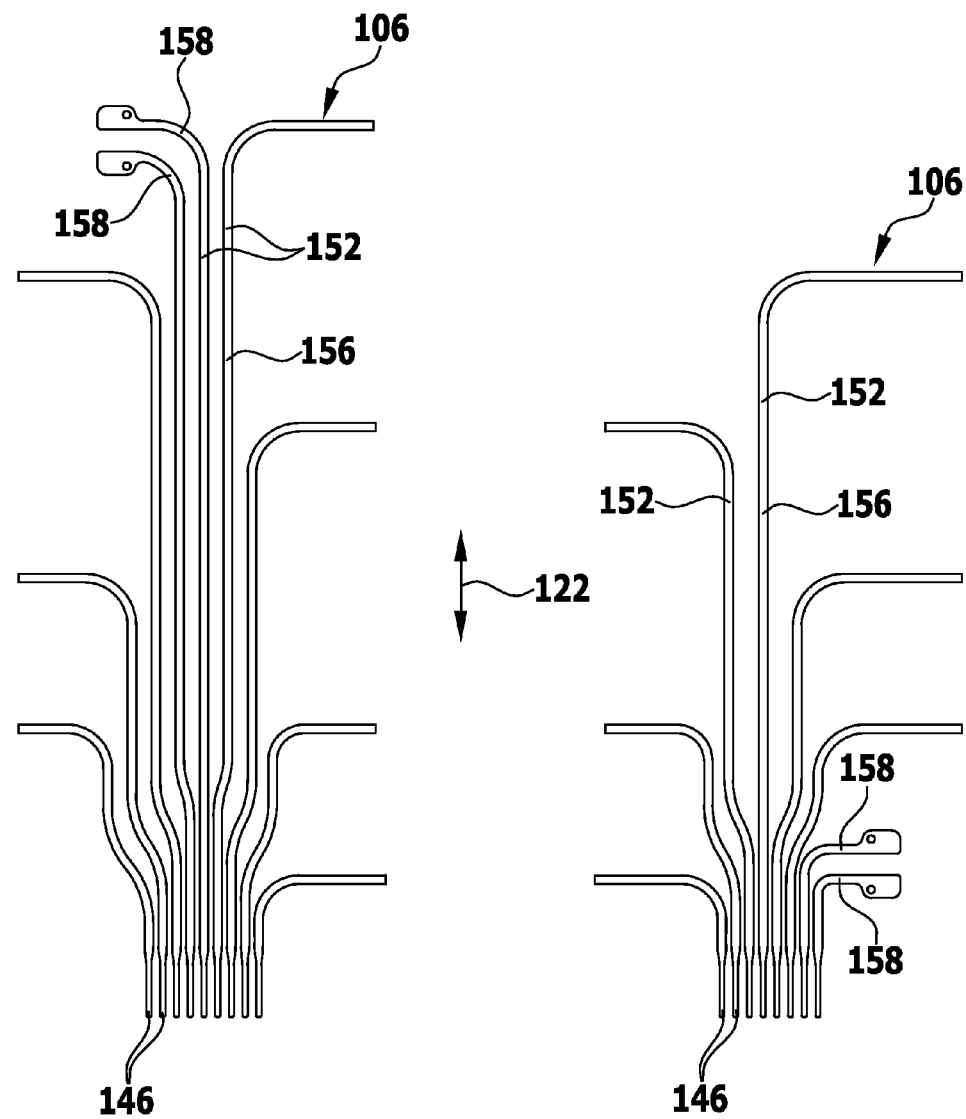
FIG. 15 shows a schematic plan view from above of the signal conductor systems of the cell contact-making system after the connection elements of the signal conductor track groups have been removed.

The signal conductor tracks 152 that remain in the cell contact-making system 100 once the connection elements 186 have been removed are illustrated in FIG. 15.

In a further method step, the current terminal connectors 135 are electrically conductively connected to the cell terminal connectors 118 of the cell contact-making system 100, preferably by a substance-to-substance bond.

Figure 16:
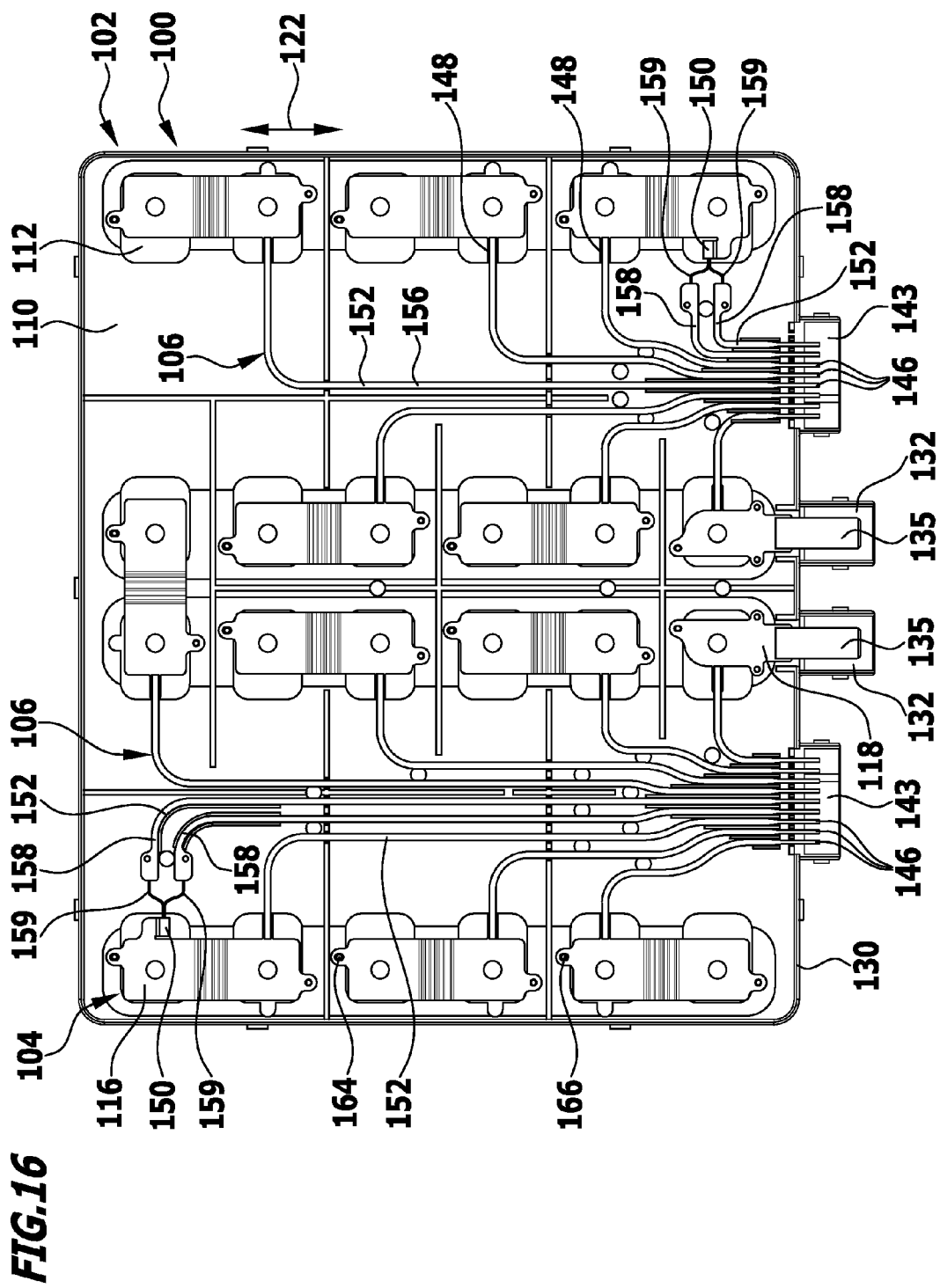
FIG. 16 shows a schematic plan view from above of the support element of the cell contact-making system with the current conductor system and the signal conductor systems after current terminal connectors of the electrochemical device have been connected to cell terminal connectors of the current conductor system.

By this means, the intermediate condition of assembly of the cell contact-making system 100 that is illustrated in FIG. 16 is achieved.

In this intermediate condition of assembly, all the components needed for making contact with the electrochemical cells 113 of the electrochemical device 111 are grouped into an assembly that is handlable as a unit, namely in the cell contact-making system 100, already in the required relative positions.

During assembly of the electrochemical device 111, the support element 102 is placed, with the current conductor system 104 and the signal conductor systems 106, on the housing 109 in which the electrochemical cells 113 are arranged, and is connected to the edge of the housing 109 that surrounds the housing opening.

Then, the cell connectors 116 and cell terminal connectors 118 are brought into electrically conductive contact with the respectively associated cell terminals 115 of the electrochemical device 111, for example by a substance-to-substance bond, in particular by welding, and/or by positive engagement.

Once contact has been made between the current conductor system 104 and the cell terminals 115 of the electrochemical cells 113 of the electrochemical device 111, the cover element 108 is placed on the support element 102 and connected thereto, in particular by being latched, with the result that the cover element 108 covers the current conductor system 104 and the signal conductor systems 106 of the cell contact-making system and protects them from undesired contact.

This prevents damage to the current conductor system 104 and the signal conductor systems 106 during transport and assembly of the electrochemical device 111.

The electrochemical device 111 that has been fully assembled can be grouped with a plurality of other electrochemical devices 111, in particular battery modules, to form an array of electrochemical devices, wherein in particular different electrochemical devices 111 can be joined together by means of module connectors (not illustrated) that connect the current terminal connectors 135 of different electrochemical devices 111 to one another.

A second embodiment of the cell contact-making system 100, illustrated in FIGS. 18 to 26, differs from the first embodiment described above in particular in that in the case of the second embodiment only two rows 120 of cell connectors 116 and cell terminal connectors 118 are provided, and consequently a single signal conductor system 106 is sufficient for connecting the signal sources 154 of the cell contact-making system 100 to a single signal conductor terminal connector 144 of the cell contact-making system 100.

Figure 21:
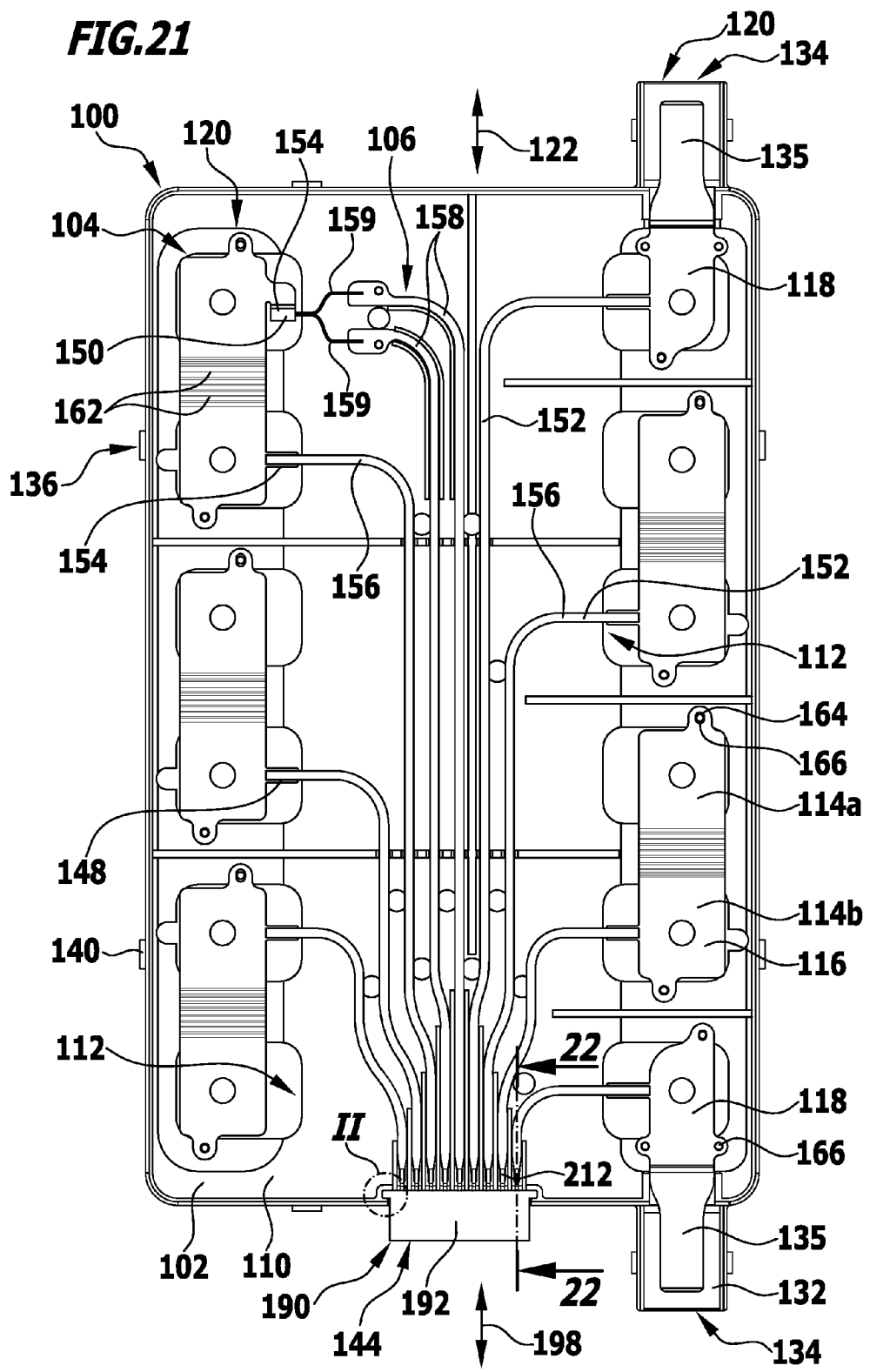
FIG. 21 shows a schematic plan view from above of the support element, the current conductor system and the signal conductor system of the cell contact-making system from FIGS. 18 to 20.
Figure 22:
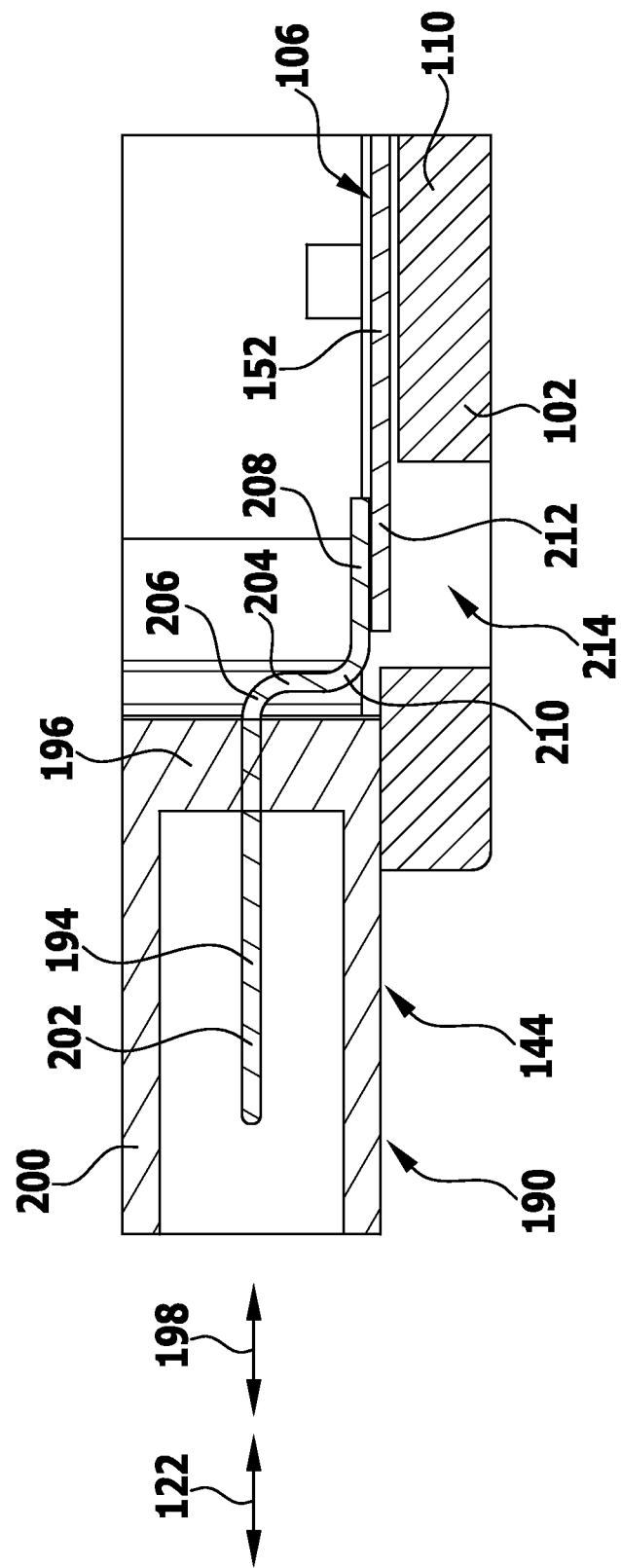
FIG. 22 shows a schematic section through the cell contact-making system from FIG. 21, along the line 22-22 in FIG. 21.

Further, as can best be seen from FIGS. 21 and 22, in this embodiment the terminal connector pins of the signal conductor terminal connector 144 are not formed in one piece with signal conductor tracks 152 of the signal conductor system 106, as is the case in the first embodiment.

Rather, in the case of this second embodiment, the signal conductor terminal connector 144 takes the form of a pre-assembled plug 190 that includes a plug housing 192 and, fixed on the plug housing 192, terminal connector pins 194.

As can best be seen from FIG. 22, the plug housing 192 includes an end wall 196, through which the terminal connector pins 194 extend, and side walls 200 that extend away from the end wall 196, in a contact direction 198.

The contact direction 198 is preferably aligned substantially parallel to the upper side of the cover plate 124, this upper side being remote from the cell terminals 115 in the assembled condition of the cell contact-making system 100, and may in particular be aligned substantially parallel to the longitudinal direction 122 of the cell contact-making system 100.

Each terminal connector pin 194 of the signal conductor terminal connector 144 preferably includes: a contact portion 202, which extends in the contact direction 198 and through the end wall 196 of the plug housing 192; a central portion 204, which adjoins an end of the contact portion 202 outside the plug housing 192, is connected to the contact portion 202 by way of a curved portion 206 and extends transversely, preferably substantially perpendicular, to the contact direction 198; and a terminal connector portion 208, which adjoins an end of the central portion 204 remote from the contact portion 202, is connected to the central portion 204 by way of a curved portion 210 and extends preferably substantially parallel to the contact portion 202 and the contact direction 198 and preferably substantially parallel to the longitudinal direction 122 of the cell contact-making system.

At the terminal connector portion 208, each terminal connector pin 194 is electrically conductively connected to an end region 212, facing the signal conductor terminal connector 144, of a respectively associated signal conductor track 152 of the signal conductor system 106.

Preferably, it is provided for the terminal connector portion 208 to be connected to the respectively associated signal conductor track 152 by a substance-to-substance bond, for example by welding and/or soldering and/or pressing, in particular crimping.

In order to enable the connection to be made between the contact portion 202 and the respectively associated signal conductor track 152, there are provided in the support element 102, adjacent to the terminal connector portions 208 of the terminal connector pins 194 and to the end regions 212 of the signal conductor tracks 152, one or more passage openings 214 through which a connection of this kind, in particular a substance-to-substance bond, is producible.

Figure 23:
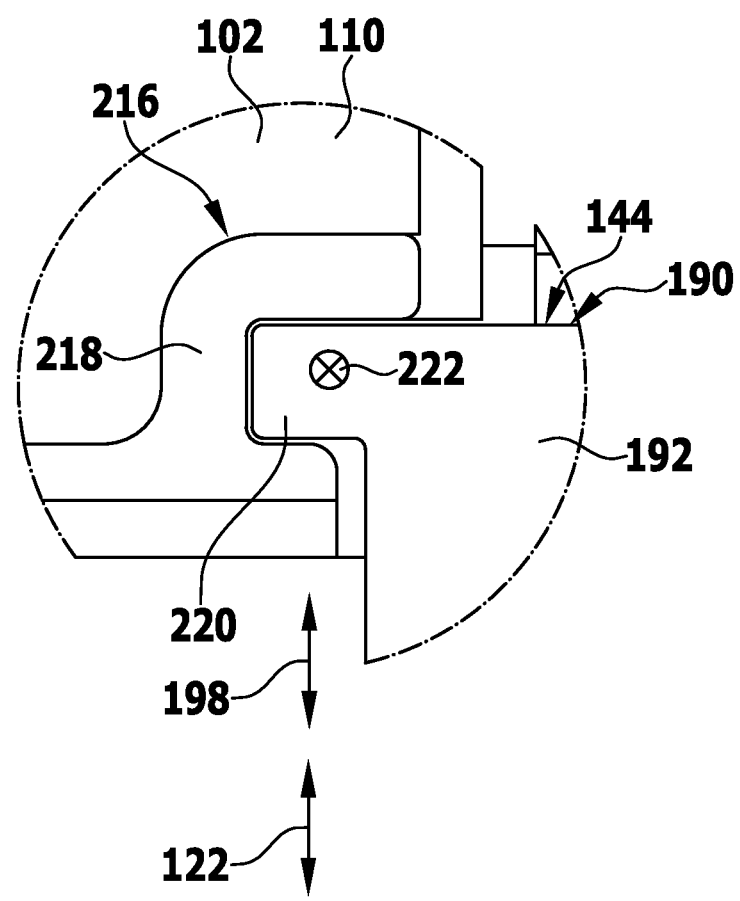
FIG. 23 shows an illustration on a larger scale of the region II in FIG. 21.

As can best be seen from FIGS. 21 and 23, for holding the signal conductor terminal connector 144 on the support element 102, there is provided a mounting 216 that includes one or more holding elements 218 on the support element side and one or more holding elements 220 on the plug housing side.

In this arrangement, in each case a holding element 218 on the support element side and, allocated thereto, a holding element 220 on the plug housing side cooperate such that when the cell contact-making system 100 is assembled the plug housing 192 is guidable into an assembled position on the support element 102 in an insertion direction 222 (which preferably runs substantially perpendicular to the contact direction 198), and in the assembled position is secured by positive engagement to prevent displacement, in particular displacement in the contact direction 198, relative to the support element 102.

In addition thereto, it may also be provided for the mounting 216 to take a form such that the plug housing 192 of the signal conductor terminal connector 144 is latchable to the support element 102.

The terminal connector pins 194 of the signal conductor terminal connector 144 are formed from a material with good electrical conductivity, for example copper or a copper alloy.

The plug housing 192 is formed from a material that is electrically non-conductive, in particular a synthetic material.

Preferably, the plug housing 192 is made from PBT (polybutylene terephthalate), PP (polypropylene), PA (polyamide), ABS (acrylonitrile butadiene styrene) and/or LCP (liquid crystal polymer), and is preferably formed substantially entirely from a synthetic material of this kind.

A particularly suitable material for the plug housing 192 is a polypropylene material with talcum filler (for example the material designated PP TV20). As a result of the talcum filler, this material has particularly good dimensional stability.

The second embodiment of the cell contact-making system 100 is preferably pre-assembled complete, as a separate assembly of the electrochemical device.

In this arrangement, the current conductor system 104 is preferably assembled on the support element 102 in the same way as was described above for the first embodiment of the cell contact-making system 100, with reference to FIGS. 8 to 11.

Figure 24:
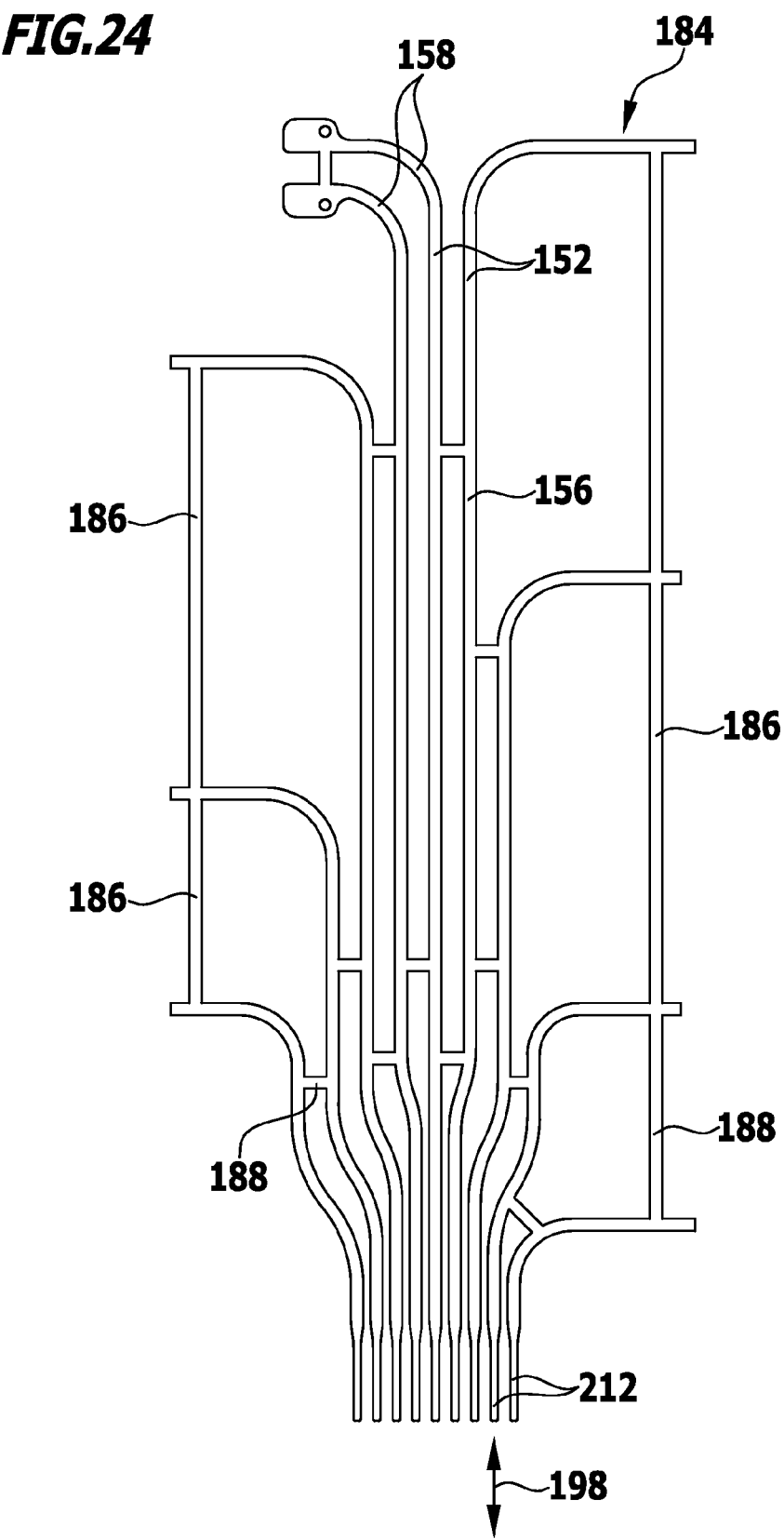
FIG. 24 shows a plan view from above of a signal conductor track group which includes a plurality of signal conductor tracks and connection elements that connect the signal conductor tracks to one another.

The signal conductor system 106 is formed by a signal conductor track group 184 illustrated in FIG. 24.

Similarly to the first embodiment, the signal conductor track group 184 includes the signal conductor tracks 152, in particular the voltage tapping conductor tracks 156 and the temperature measuring conductor tracks 158, of the signal conductor system 106, and connection elements 186, each of which connect at least two of these signal conductor tracks 152 to one another, with the result that, overall, all the signal conductor tracks 152 of a signal conductor track group 184 are connected to one another directly or indirectly by way of the connection elements 186 and form a jointly handlable unit.

Further, each signal conductor track 152 of the signal conductor track group 184 is formed in one piece with a respective end region 212 for connecting to a terminal connector pin 194 of the signal conductor terminal connector 144.

Preferably, each signal conductor track 152 of the signal conductor track group 184 is connected by way of at least two connection elements 186, for example in the form of connection webs 188, to one or more other signal conductor tracks 152 of the signal conductor track group 184.

Figure 25:
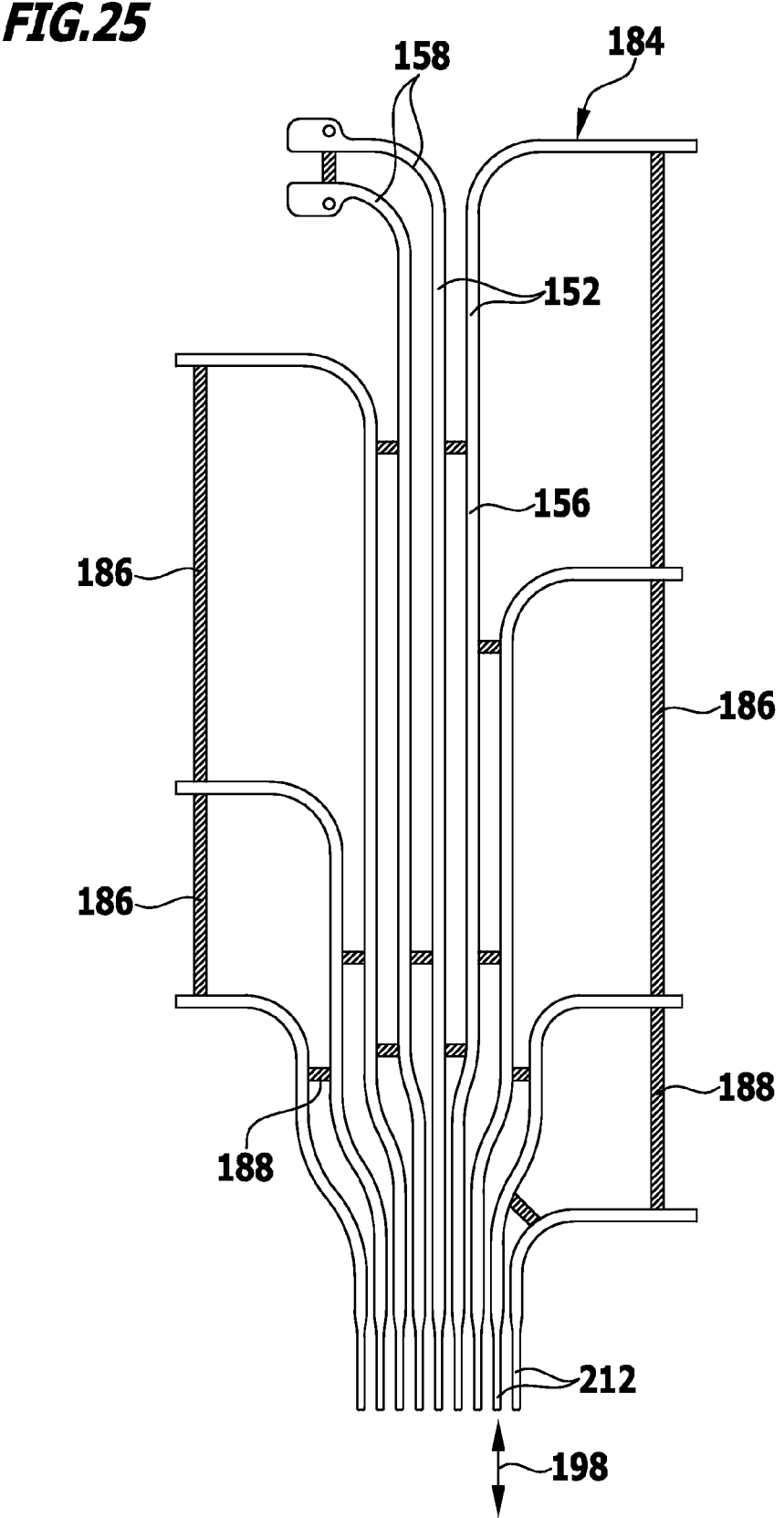
FIG. 25 shows an illustration, corresponding to FIG. 24, of the signal conductor track group in which the connection elements are highlighted by hatching.

The connection elements 186 of the signal conductor track group 184 are highlighted by hatching in FIG. 25 and so are particularly easily distinguishable from the signal conductor tracks 152.

The signal conductor track group 184 is separated out from a suitable starting material, for example from a metal starting material, in particular a starting material in sheet-metal form, for example by being punched out or cut out.

As the starting material, in principle any material may be used which has sufficient electrical conductivity.

Preferably, there is used for the signal conductor track group 184 a starting material that contains copper, in particular copper or a copper alloy.

It is particularly favorable if substantially the same material is used for the signal conductor track group 184 as for the terminal connector pins 194 of the signal conductor terminal connector 144.

Since the currents flowing in the signal conductor system 106 are smaller than the currents flowing in the current conductor system 104, it is also possible in particular for the material thickness of the starting material of the signal conductor track group 184 and hence the material thickness of the signal conductor tracks 152 of the signal conductor system 106 to be different from the material thickness of the starting material of the current conductor group 170 and hence different from the material thickness of the cell connectors 116 and cell terminal connectors 118 of the current conductor system 104.

Preferably, the material thickness of the signal conductor track group 184 is less than the material thickness of the current conductor group 170.

The signal conductor tracks 152 of the signal conductor system 106 and the cell connectors 116 and/or cell terminal connectors 118 of the cell contact-making system 100 may thus differ from one another, in particular in respect of their material and/or their material thickness.

The signal conductor track group 184 that is separated out from the starting material is positioned in a separating tool (not illustrated).

The separating tool is different from the tool by means of which the signal conductor track group 184 has been separated out from the starting material, and is preferably arranged in the vicinity of the point at which the support element 102 is provided for assembly of the cell contact-making system 100.

In a subsequent method step, the connection elements 186, in particular the connection webs 188, of the signal conductor track group 184 are severed from the signal conductor tracks 152 by means of the separating tool, for example by being punched out.

Figure 26:
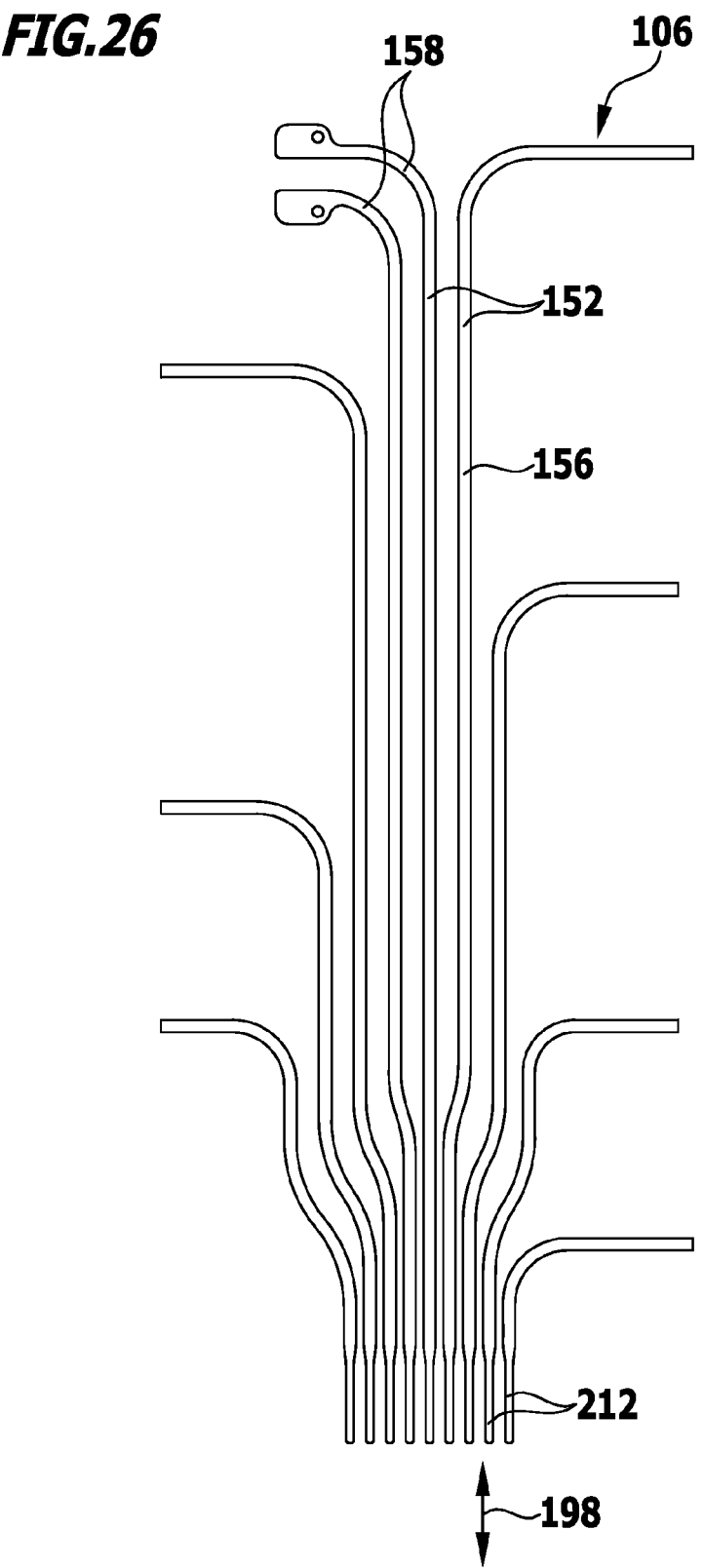
FIG. 26 shows a plan view from above of the signal conductor tracks of the signal conductor track group from FIGS. 24 and 25 after the connection elements have been removed in a separating tool that is arranged separately from the support element of the cell contact-making system.

The signal conductor tracks 152 that have been severed from the connection elements 186, and which are now arranged in the separating tool such that they are mutually independently movable, are illustrated in FIG. 26.

From the separating tool, the signal conductor tracks 152 are now transported separately, substantially simultaneously or successively, from the separating tool to the support element 102.

This transport may be carried out for example by an assembly operative by hand, or indeed by means of an automatically operating handling device, in particular a gripper device.

The signal conductor tracks 152 which have been separated from one another are positioned on the support element 102 such that end regions of the voltage tapping conductor tracks 156 overlap with the voltage tapping points 148 of the cell connectors 116 or cell terminal connectors 118, and end regions of the temperature measuring conductor tracks 158 overlap with the end regions of the terminal connector lines 159 of the temperature sensors 150, as described above in the context of assembly of the first embodiment of the cell contact-making system 100.

In this position, the signal conductor tracks 152 are fixed to the support element 102, for example by caulking.

Then, the mutually overlapping regions of the signal conductor tracks 152 on the one hand and the cell connectors 116, cell terminal connectors 118 and terminal connector lines 159 of the temperature sensors 150 on the other are connected to one another, preferably by a substance-to-substance bond, for example by ultrasound welding.

Figure 20:
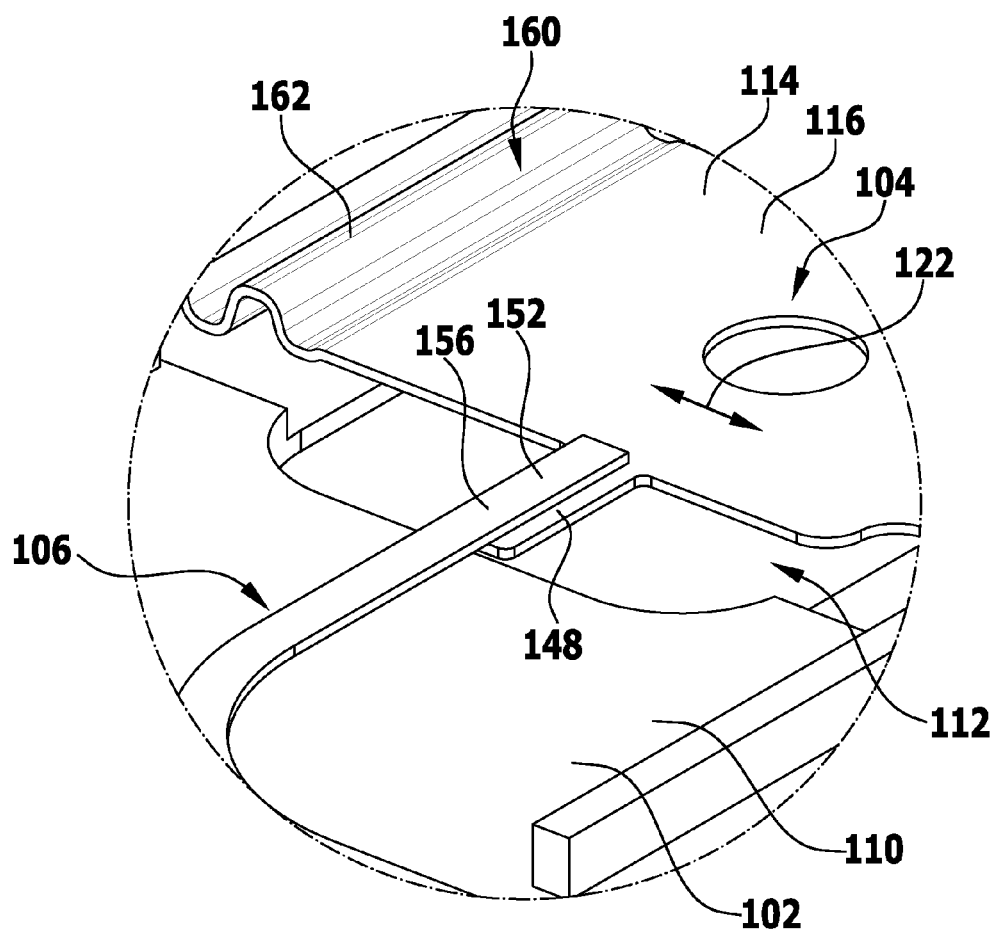
FIG. 20 shows an illustration on a larger scale of the region I in FIG. 19.

In order to make this connection possible, the regions that lie below the overlapping regions of the signal conductor tracks 152 having the cell connectors 116, cell terminal connectors 118 and terminal connector lines 159 of the temperature sensors 150 are preferably recessed in the support element 102 (see in particular FIG. 20).

The current terminal connectors 135 may be formed in one piece with the cell terminal connectors 118, with the result that in this case it is no longer necessary to electrically conductively connect the current terminal connectors 135 to the cell terminal connectors 118 of the cell contact-making system 100, preferably by a substance-to-substance bond.

Now all the components needed for the electrochemical cells 113 of the electrochemical device 111 to make contact are grouped together in an assembly that is handlable as a unit, namely in the cell contact-making system 100, already in the required relative positions.

During assembly of the electrochemical device 111, the support element 102 is placed, with the current conductor system 104 and the signal conductor system 106, on the housing 109 in which the electrochemical cells 113 are arranged, and is connected to the edge of the housing 109 that surrounds the housing opening.

Then, the cell connectors 116 and cell terminal connectors 118 are brought into electrically conductive contact with the respectively associated cell terminals 115 of the electrochemical device 111, for example by a substance-to-substance bond, in particular by welding, and/or by positive engagement.

Once contact has been made between the current conductor system 104 and the cell terminals 115 of the electrochemical cells 113 of the electrochemical device 111, the cover element 108 is placed on the support element 102 and connected thereto, in particular by being latched, with the result that the cover element 108 covers the current conductor system 104 and the signal conductor system 106 of the cell contact-making system 100 and protects them from undesired contact.

This prevents damage to the current conductor system 104 and the signal conductor system 106 during transport and assembly of the electrochemical device 111.

Otherwise, the second embodiment, illustrated in FIGS. 18 to 26, of the cell contact-making system 100 corresponds, as regards its structure, functioning and manner of production, to the first embodiment illustrated in FIGS. 1 to 17, so in this respect reference is made to the description thereof above.

The invention claimed is:

1. A method for producing a cell contact-making system for an electrochemical device, including the following:
    separating out from a first starting material at least one signal conductor track group, which includes at least two signal conductor tracks of a signal conductor system of the cell contact-making system, by which signal sources or measuring points of the electrochemical device are electrically conductively connected to a signal conductor terminal connector serving as an interface for a monitoring unit of the electrochemical device, and at least one connection element by means of which at least two of the signal conductor tracks are directly connected to one another;
    separating out from a second starting material, which is different from the first starting material, at least one cell connector or cell terminal connector;
    connecting the signal conductor tracks of the signal conductor track group separated out from the first starting material to a respective cell connector or cell terminal connector separated out from the second starting material or to a sensor element of the cell contact-making system by a substance-to-substance bond or with positive engagement, after the separating out of the signal conductor track group from the first starting material; and
    removing the at least one connection element.

2. The method according to claim 1, wherein the signal conductor tracks and the cell connectors and/or cell terminal connectors of the cell contact-making system differ from one another in respect of their material and/or their material thickness.

3. The method according to claim 1, wherein the first starting material contains copper, and wherein the signal conductor tracks are formed from the first starting material.

4. The method according to claim 1, wherein the second starting material contains aluminum, and wherein the cell connectors and/or cell terminal connectors of the cell contact-making system are formed from the second starting material.

5. The method according to claim 1, wherein the method further includes the following:
    separating out from the second starting material a current conductor group which includes at least two cell connectors or cell terminal connectors and at least one connection element by means of which at least two of the cell connectors or cell terminal connectors are connected to one another.

6. The method according to claim 1, wherein the signal conductor track group includes, in addition to the signal conductor tracks, at least one plug contact or terminal connector pin.

7. The method according to claim 6, wherein at least one plug contact or terminal connector pin is formed in one piece with at least one signal conductor track.

8. The method according to claim 6, wherein at least one plug contact or terminal connector pin is connected to a plug housing.

9. The method according to claim 1, wherein at least one signal conductor track of the signal conductor track group is connected to a temperature sensor.

10. The method according to claim 1, wherein the first starting material for the signal conductor track group is provided at least partly with a coating.

11. The method according to claim 1, wherein the signal conductor track group is fixed to a support element of the cell contact-making system before being connected to the cell connectors, cell terminal connectors and/or sensor elements of the cell contact-making system.

12. The method according to claim 11, wherein the support element has at least one passage opening which enables access to a contact point between the signal conductor track group on the one hand and a cell connector, cell terminal connector and/or sensor element of the cell contact-making system on the other.

13. The method according to claim 1, wherein once the cell connectors and/or cell terminal connectors have been connected to the signal conductor tracks, the cell connectors and/or cell terminal connectors and signal conductor tracks of the cell contact-making system are covered by means of a cover element.

14. A cell contact-making system for an electrochemical device that includes a plurality of electrochemical cells, including at least one cell connector for electrically conductively connecting cell terminals of electrochemical cells of the electrochemical device, and
    a signal conductor system having a plurality of signal conductor tracks which are connected to a respective cell connector, cell terminal connector or sensor element of the cell contact-making system,
    wherein signal sources or measuring points of the electrochemical device are electrically conductively connected by the signal conductor system to a signal conductor terminal connector serving as an interface to a monitoring unit of the electrochemical device,
    wherein the signal conductor tracks are produced by separating out from a first starting material a signal conductor track group, which includes at least two signal conductor tracks and at least one connection element directly connecting the signal conductor tracks to one another, connecting the signal conductor tracks of the signal conductor track group to a respective cell connector, cell terminal connector or sensor element of the cell contact-making system by a substance-to-substance bond or with positive engagement, after the separating out of the signal conductor track group from the first starting material, and removing the at least one connection element, wherein the respective cell connector or cell terminal connector is produced by separating out the respective cell connector or cell terminal connector from a second starting material, which is different from the first starting material.

\* \* \* \* \*